(12) United States Patent
Gunji et al.

(10) Patent No.: US 11,958,454 B2
(45) Date of Patent: Apr. 16, 2024

(54) TUBE FITTING AND TUBE EQUIPPED WITH TUBE FITTING

(71) Applicant: SANOH INDUSTRIAL CO., LTD., Tokyo (JP)

(72) Inventors: Takahiro Gunji, Ibaraki (JP); Atsushi Kurosawa, Ibaraki (JP)

(73) Assignee: SANOH INDUSTRIAL CO., LTD., Tokyo (JP)

(*) Notice: Subject to any disclaimer, the term of this patent is extended or adjusted under 35 U.S.C. 154(b) by 174 days.

(21) Appl. No.: 17/634,064

(22) PCT Filed: Aug. 7, 2020

(86) PCT No.: PCT/JP2020/030385
§ 371 (c)(1),
(2) Date: Feb. 9, 2022

(87) PCT Pub. No.: WO2021/029363
PCT Pub. Date: Feb. 18, 2021

(65) Prior Publication Data
US 2022/0348181 A1 Nov. 3, 2022

(30) Foreign Application Priority Data
Aug. 9, 2019 (JP) ................. 2019-156189

(51) Int. Cl.
*B60T 17/04* (2006.01)
*F16B 7/18* (2006.01)
(Continued)

(52) U.S. Cl.
CPC .............. *B60T 17/043* (2013.01); *F16B 7/18* (2013.01); *F16B 33/06* (2013.01); *F16L 19/028* (2013.01); *F16L 58/184* (2013.01)

(58) Field of Classification Search
CPC . F16L 19/028; F16L 19/0286; F16L 19/0243; F16L 58/182; F16L 58/184
See application file for complete search history.

(56) References Cited

U.S. PATENT DOCUMENTS 7,360,798 B2 * 4/2008 Matsumoto ........... F16L 58/182
9,321,982 B2 * 4/2016 Goto ..................... F16L 58/182
(Continued)

FOREIGN PATENT DOCUMENTS

EP 2706277 A2 3/2014
JP 2009-299895 A 12/2009
(Continued)

OTHER PUBLICATIONS

Search Report and Written Opinion in International Application No. PCT/JP2020/030385 dated Oct. 6, 2020, 11 pages.
(Continued)

*Primary Examiner* — Zachary T Dragicevich
(74) *Attorney, Agent, or Firm* — MARSHALL, GERSTEIN & BORUN LLP

(57) ABSTRACT

A tube fitting includes: a zinc-based plated layer; and a resin coating layer that is positioned at an outermost surface at an outer side of the zinc-based plated layer and includes a polyethylene substance, a lubricant, and solid particles. When a fitting average plating thickness t relating to the thickness of the zinc-based plated layer is defined, $2.1 < t < 19.7$ is true.

8 Claims, 11 Drawing Sheets

(51) Int. Cl.
*F16B 33/06* (2006.01)
*F16L 19/028* (2006.01)
*F16L 58/18* (2006.01)

(56) References Cited

U.S. PATENT DOCUMENTS

| | | | |
|---|---|---|---|
| 10,072,778 B2* | 9/2018 | Heutchy | F16L 58/184 |
| 10,107,429 B2* | 10/2018 | Jensen | F16L 19/028 |
| 2007/0196632 A1* | 8/2007 | Meyer, Jr. | C23C 22/83 |
| 2009/0324363 A1 | 12/2009 | Abbott et al. | |
| 2011/0204623 A1* | 8/2011 | Weick | F16L 19/0283 |
| 2015/0354735 A1 | 12/2015 | Stahn | |
| 2018/0172197 A1* | 6/2018 | Verleene | F16L 58/182 |
| 2020/0271251 A1 | 8/2020 | Gunji et al. | |
| 2021/0364119 A1* | 11/2021 | Goto | F16L 58/182 |

FOREIGN PATENT DOCUMENTS

| | | | |
|---|---|---|---|
| JP | 2015-230099 A | 12/2015 | |
| JP | 6566376 B1 | 8/2019 | |

OTHER PUBLICATIONS

Extended European Search Report in EP Application No. 20852970.1 dated Dec. 15, 2023, 12 pages.
Deutsche Norm: "Hydraulische Bremsanlagen Bremsrohrarmaturen", Deutsche Norm, vol. 74233, Feb. 1, 1991, pp. 1-3, XP055917670.
"Hydraulische Bremsanlagen Bremsrohre Boedel/ /Hydraulic Braking Systems; Brake Pipes, Flares", Deutsche Normen. Din Norm, Din, De, vol. 74.234, Sep. 1, 1992, pp. 1-4, XP009065028.

* cited by examiner

FIG. 10

| NUMBER | COATING AGENT | NOMINAL THREAD DIAMETER [mm] | CONTACT PORTION INNER DIAMETER d [mm] | TUBE OUTER DIAMETER φ [mm] | FITTING AVERAGE PLATING THICKNESS t [μm] |
|---|---|---|---|---|---|
| #101 | C1 | M10 | 4.98 | 4.76 | 3.1 |
| #102 | C1 | M10 | 4.98 | 4.76 | 6.7 |
| #103 | C1 | M10 | 4.98 | 4.76 | 15.9 |
| #104 | C1 | M12 | 4.98 | 4.76 | 3.4 |
| #105 | C1 | M12 | 4.98 | 4.76 | 6.9 |
| #106 | C1 | M12 | 4.98 | 4.76 | 16.6 |
| #107 | C1 | M12 | 6.24 | 6 | 1.4 |
| #108 | C1 | M12 | 6.24 | 6 | 1.9 |
| #109 | C1 | M12 | 6.24 | 6 | 2.2 |
| #110 | C1 | M12 | 6.24 | 6 | 3.0 |
| #111 | C1 | M12 | 6.24 | 6 | 3.3 |
| #112 | C1 | M12 | 6.24 | 6 | 4.1 |
| #113 | C1 | M12 | 6.24 | 6 | 5.1 |
| #114 | C1 | M12 | 6.24 | 6 | 5.6 |
| #115 | C1 | M12 | 6.24 | 6 | 6.3 |
| #116 | C1 | M12 | 6.24 | 6 | 7.3 |
| #117 | C1 | M12 | 6.24 | 6 | 9.8 |
| #118 | C1 | M12 | 6.24 | 6 | 12.2 |
| #119 | C1 | M12 | 6.24 | 6 | 13.4 |
| #120 | C1 | M12 | 6.24 | 6 | 16.5 |
| #121 | C1 | M12 | 6.24 | 6 | 19.6 |
| #122 | C1 | M12 | 6.24 | 6 | 20.2 |
| #123 | C1 | M12 | 6.24 | 6 | 20.6 |
| #201 | C2 | M10 | 4.98 | 4.76 | 3.4 |
| #202 | C2 | M10 | 4.98 | 4.76 | 6.7 |
| #203 | C2 | M10 | 4.98 | 4.76 | 15.5 |
| #204 | C2 | M12 | 4.98 | 4.76 | 3.4 |
| #205 | C2 | M12 | 4.98 | 4.76 | 7.0 |
| #206 | C2 | M12 | 4.98 | 4.76 | 16.8 |
| #207 | C2 | M12 | 6.24 | 6 | 2.7 |
| #208 | C2 | M12 | 6.24 | 6 | 6.6 |
| #209 | C2 | M12 | 6.24 | 6 | 14.8 |

FIG. 13

| NUMBER | COATING AGENT | NOMINAL THREAD DIAMETER [mm] | FITTING AVERAGE PLATING THICKNESS t [μm] | INITIAL AXIAL FORCE F1 [kN] | AXIAL FORCE DECREASE RATE α [kN / TEST ROUND] |
|---|---|---|---|---|---|
| #101 | C1 | M10 | 3.1 | 13.95 | 0.75 |
| #102 | C1 | M10 | 6.7 | 13.69 | 0.97 |
| #103 | C1 | M10 | 15.9 | 11.77 | 0.69 |
| #104 | C1 | M12 | 3.4 | 13.82 | 0.79 |
| #105 | C1 | M12 | 6.9 | 12.92 | 0.84 |
| #106 | C1 | M12 | 16.6 | 11.14 | 0.74 |
| #107 | C1 | M12 | 1.4 | 13.58 | 1.77 |
| #108 | C1 | M12 | 1.9 | 13.42 | 1.77 |
| #109 | C1 | M12 | 2.2 | 13.54 | 1.42 |
| #110 | C1 | M12 | 3.0 | 13.22 | 1.01 |
| #111 | C1 | M12 | 3.3 | 13.32 | 0.78 |
| #112 | C1 | M12 | 4.1 | 12.32 | 0.82 |
| #113 | C1 | M12 | 5.1 | 11.89 | 0.65 |
| #114 | C1 | M12 | 5.6 | 12.25 | 0.88 |
| #115 | C1 | M12 | 6.3 | 12.05 | 0.63 |
| #116 | C1 | M12 | 7.3 | 12.94 | 0.91 |
| #117 | C1 | M12 | 9.8 | 11.16 | 0.57 |
| #118 | C1 | M12 | 12.2 | 10.97 | 0.73 |
| #119 | C1 | M12 | 13.4 | 10.85 | 0.61 |
| #120 | C1 | M12 | 16.5 | 11.04 | 0.57 |
| #121 | C1 | M12 | 19.6 | 10.11 | 0.49 |
| #122 | C1 | M12 | 20.2 | 9.55 | 0.43 |
| #123 | C1 | M12 | 20.6 | 9.41 | 0.64 |
| #201 | C2 | M10 | 3.4 | 13.49 | 0.94 |
| #202 | C2 | M10 | 6.7 | 13.28 | 1.00 |
| #203 | C2 | M10 | 15.5 | 11.58 | 0.77 |
| #204 | C2 | M12 | 3.4 | 13.40 | 1.04 |
| #205 | C2 | M12 | 7.0 | 11.73 | 1.03 |
| #206 | C2 | M12 | 16.8 | 10.70 | 0.76 |
| #207 | C2 | M12 | 2.7 | 13.79 | 1.09 |
| #208 | C2 | M12 | 6.6 | 12.56 | 0.95 |
| #209 | C2 | M12 | 14.8 | 10.20 | 0.76 |

FIG. 14

| NUMBER | FITTING AVERAGE PLATING THICKNESS t [μm] | INITIAL AXIAL FORCE F1 [kN] | AXIAL FORCE DECREASE RATE α [kN / TEST ROUND] | PASS ? | CRITERION a | CRITERION b |
|---|---|---|---|---|---|---|
| #107 | 1.4 | 13.58 | 1.77 | NO | y | n |
| #108 | 1.9 | 13.42 | 1.77 | NO | y | n |
| #109 | 2.2 | 13.54 | 1.42 | YES | y | y |
| #207 | 2.7 | 13.79 | 1.09 | YES | y | y |
| #110 | 3.0 | 13.22 | 1.01 | YES | y | y |
| #101 | 3.1 | 13.95 | 0.75 | YES | y | y |
| #111 | 3.3 | 13.32 | 0.78 | YES | y | y |
| #104 | 3.4 | 13.82 | 0.79 | YES | y | y |
| #201 | 3.4 | 13.49 | 0.94 | YES | y | y |
| #204 | 3.4 | 13.40 | 1.04 | YES | y | y |
| #112 | 4.1 | 12.32 | 0.82 | YES | y | y |
| #113 | 5.1 | 11.89 | 0.65 | YES | y | y |
| #114 | 5.6 | 12.25 | 0.88 | YES | y | y |
| #115 | 6.3 | 12.05 | 0.63 | YES | y | y |
| #208 | 6.6 | 12.56 | 0.95 | YES | y | y |
| #102 | 6.7 | 13.69 | 0.97 | YES | y | y |
| #202 | 6.7 | 13.28 | 1.00 | YES | y | y |
| #105 | 6.9 | 12.92 | 0.84 | YES | y | y |
| #205 | 7.0 | 11.73 | 1.03 | YES | y | y |
| #116 | 7.3 | 12.94 | 0.91 | YES | y | y |
| #117 | 9.8 | 11.16 | 0.57 | YES | y | y |
| #118 | 12.2 | 10.97 | 0.73 | YES | y | y |
| #119 | 13.4 | 10.85 | 0.61 | YES | y | y |
| #209 | 14.8 | 10.20 | 0.76 | YES | y | y |
| #203 | 15.5 | 11.58 | 0.77 | YES | y | y |
| #103 | 15.9 | 11.77 | 0.69 | YES | y | y |
| #120 | 16.5 | 11.04 | 0.57 | YES | y | y |
| #106 | 16.6 | 11.14 | 0.74 | YES | y | y |
| #206 | 16.8 | 10.70 | 0.76 | YES | y | y |
| #121 | 19.6 | 10.11 | 0.49 | YES | y | y |
| #122 | 20.2 | 9.55 | 0.43 | NO | n | y |
| #123 | 20.6 | 9.41 | 0.64 | NO | n | y |

TUBE FITTING AND TUBE EQUIPPED WITH TUBE FITTING

TECHNICAL FIELD

The present disclosure relates to a tube fitting and a tube equipped with the tube fitting.

BACKGROUND ART

It is well known to apply a lubricant or an adhesive, and/or to apply a surface treatment such as plating, to the surfaces of standardized threaded members such as bolts and nuts for the purpose of preventing loosening of the threaded members and enhancing their axial force. Furthermore, technologies for applying a resin coating to a threaded tube fitting used for a brake tube of an automobile, for example, are known (e.g., see the specifications of JP-A No. 2015-230099, JP-A No. 2009-299895, and European Patent Application Publication No. 2706277).

When the tightening torque for fastening a threaded member to a mating member is constant, the axial force becomes greater the smaller the frictional force acting between the threaded member and the mating member is. Thus, a surface treatment is applied to the threaded member to reduce the frictional force. Because of this, a large axial force can be obtained with the same tightening torque. This is true not only for standardized threaded members but also for threaded tube fittings.

SUMMARY OF INVENTION

Technical Problem

When using a tube fitting to connect a metal tube, a ring-shaped portion called an ISO flare or a double flare is formed on the end of the tube in a state in which the tube fitting is fitted to the outer periphery of the tube. The ring-shaped portion projects outward in the tube radial direction and is larger than the inner diameter of the tube fitting, so the tube fitting is prevented from coming off at the end by the ring-shaped portion. Furthermore, a tube for automobile tubing undergoes a bending process in accordance with the layout of the bottom portion of the vehicle, so the tube fitting is also prevented from coming off in a direction away from the end by the bend portion of the tube. For that reason, when the tube fitting is loosened and the tube is removed to service or repair any of various devices to which the tube is connected and then the tube is returned back to its former state, the same tube fitting must be reused every time service or repairs are performed unless the tube fitting is replaced together with the tube.

When the tube fitting is repeatedly fastened and unfastened with the same tightening torque to reuse the tube fitting, the axial force has tended to decrease as the number of times the tube fitting is repeatedly fastened and unfastened increases. For that reason, when the tube fitting is fastened with the same tightening torque when the tube fitting is reused, there is the potential for the desired connection force to not be obtained with the reused tube fitting because the axial force decreases the larger the axial force decrease rate is.

At the same time, corotation, where the tube rotates together with the tube fitting when the tube fitting is fastened, sometimes occurs. Corotation occurs when the frictional force occurring between the ring-shaped portion provided in the tube and the tube fitting exceeds the frictional force occurring between the ring-shaped portion and the mating member. When the tube fitting is fastened while the tube is held still to deter this corotation, a corotation torque, in which the tube is twisted, is generated as a reaction force that deters the corotation. If the corotation torque is high, this damages the tube. Furthermore, the reaction force of the corotation torque acts in the direction for loosening the fastened tube fitting, so if the corotation torque persists in a state in which the tube is attached to the vehicle, vibration of the vehicle causes the tube fitting to become loose. For that reason, the upper limit value for the corotation torque that occurs when fastening the tube fitting is determined in consideration of the strength of the tube and vibration of the vehicle.

The corotation torque is at a maximum when the tube fitting is initially fastened, decreases the next time the tube fitting is used, and has tended to not change much with the number of times the tube fitting is subsequently used. For that reason, if the corotation torque is less than the upper limit value when the tube fitting is initially fastened, the corotation torque does not exceed the upper limit value when the tube fitting is reused.

It has been known that the purposes of applying a zinc-based plating to a tube fitting include improving corrosion resistance and stabilizing axial force by smoothing, with the plating, the surface on which a resin coating layer is to be provided. The present inventors found after studying the reuse of tube fittings that a thickness of the zinc-based plated layer that is on the inside of the resin coating layer affects the axial force decrease rate resulting from reuse of the tube fitting and the corotation torque when the tube fitting is initially fastened.

Thus, it is an object of the present disclosure to provide a tube fitting and a tube equipped with the tube fitting which, when the tube fitting is repeatedly fastened and unfastened, can obtain an initial axial force where the corotation torque is less than the upper limit value and can keep the axial force decrease rate low.

Solution to Problem

A tube fitting of the present disclosure is a tube fitting that is fitted to an outer periphery of a metal tube having, at an end portion thereof, a ring-shaped portion projecting outward in a tube radial direction, and which is, by being fastened to a mating member in a state in which the tube fitting is in contact with the ring-shaped portion, capable of connecting the tube to the mating member, the tube fitting including: a threaded portion in which are formed male threads that mate with female threads provided at the mating member; a head portion that is provided at one end side of the threaded portion and to which a tightening torque is input during fastening; a contact portion that is provided at another end side of the threaded portion and is for contacting the ring-shaped portion and simultaneously pressing the ring-shaped portion against the mating member during fastening to the mating member; a zinc-based plated layer that is provided at the threaded portion, the head portion, and the contact portion; and a resin coating layer that is positioned at an outermost surface at an outer side of the zinc-based plated layer and includes a polyethylene-based substance, a lubricant, and solid particles, wherein the threaded portion, a through hole extends through the head portion, and the contact portion, in a direction parallel to an advancing direction of the male threads during fastening, the male threads of the threaded portion have an outer diameter of 9.53 to 14.0 [mm], the head portion includes a first plane facing an opposite direction from the advancing direction and a second plane orthogonal to the first plane, the contact portion includes a contact surface capable of contacting the ring-shaped portion and has an inner diameter of 4.98 to 8.44 [mm], and in a case of, counting from a head portion side the number of threads configuring the male threads in a cross-section that includes a center line extending in the same direction as the through hole and is orthogonal to the second plane of the head portion, a first thread is defined as the first thread, a second thread is defined as the second thread, a third thread is defined as the third thread, and a fourth thread is defined as the fourth thread, a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section, $2.1 < t < 19.7$ is true.

A tube equipped with a tube fitting of the present disclosure is a tube equipped with a tube fitting including: a metal tube having, at an end portion thereof, a ring-shaped portion projecting outward in a tube radial direction and having a bend portion at a position away from the ring-shaped portion; and a tube fitting that is fitted to an outer periphery of the tube in a state in which the tube fitting is prevented from coming off by the ring-shaped portion and the bend portion, and which is, by being fastened to a mating member in a state in which the tube fitting is in contact with the ring-shaped portion, capable of connecting the tube to the mating member, wherein the tube fitting includes a threaded portion in which are formed male threads that mate with female threads provided at the mating member, a head portion that is provided at one end side of the threaded portion and to which a tightening torque is input during fastening, a contact portion that is provided at another end side of the threaded portion and is for contacting the ring-shaped portion and simultaneously pressing the ring-shaped portion against the mating member during fastening to the mating member, a zinc-based plated layer that is provided at the threaded portion, the head portion, and the contact portion, and a resin coating layer that is positioned at an outermost surface at an outer side of the zinc-based plated layer and includes a polyethylene-based substance, a lubricant, and solid particles, the threaded portion, the head portion, and the contact portion are penetrated by a through hole extending in a direction parallel to an advancing direction of the male threads during fastening, the male threads of the threaded portion have an outer diameter of 9.53 to 14.0 [mm], the head portion includes a first plane facing the opposite direction from the advancing direction and a second plane orthogonal to the first plane, the contact portion includes a contact surface capable of contacting the ring-shaped portion and has an inner diameter of 4.98 to 8.44 [mm], and in a case of, counting from a head portion side the number of threads configuring the male threads in a cross-section that includes a center line extending in the same direction as the through hole and is orthogonal to the second plane of the head portion, a first thread is defined as the first thread, a second thread is defined as the second thread, a third thread is defined as the third thread, and a fourth thread is defined as the fourth thread, a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section, $2.1 < t < 19.7$ is true.

Another tube fitting of the present disclosure is a tube fitting that is fitted to an outer periphery of a metal tube having, at an end portion thereof, a ring-shaped portion projecting outward in a tube radial direction, and which is, by being fastened to a mating member in a state in which the tube fitting is in contact with the ring-shaped portion, capable of connecting the tube to the mating member, the tube fitting, comprising: a threaded portion in which are formed male threads that mate with female threads provided at the mating member; a head portion that is provided at one end side of the threaded portion and to which a tightening torque is input during fastening; a contact portion that is provided at another end side of the threaded portion and is for contacting the ring-shaped portion and simultaneously pressing the ring-shaped portion against the mating member during fastening to the mating member; a zinc-based plated layer that is provided at the threaded portion, the head portion, and the contact portion; and a resin coating layer that is positioned at an outermost surface at an outer side of the zinc-based plated layer and includes a polyethylene-based substance, a lubricant, and solid particles, wherein a through hole extends through the threaded portion, the head portion, and the contact portion, in a direction parallel to an advancing direction of the male threads during fastening, the male threads of the threaded portion have an outer diameter of 9.53 to 14.0 [mm], the head portion includes a first plane facing the opposite direction from the advancing direction and a second plane orthogonal to the first plane, the contact portion includes a contact surface capable of contacting the ring-shaped portion and has an inner diameter of 4.98 to 8.44 [mm], in a case of, counting from a head portion side the number of threads configuring the male threads in a cross-section that includes a center line extending in the same direction as the through hole and is orthogonal to the second plane of the head portion, a first thread is defined as the first thread, a second thread is defined as the second thread, a third thread is defined as the third thread, and a fourth thread is defined as the fourth thread, a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section, and in a case in which a testing member corresponding to the mating member and a testing tube with a same outer diameter as the tube and having a testing ringlike portion corresponding to the ring-shaped portion are prepared and a fastening test including a fastening operation for fastening the tube fitting to the testing member with a tightening torque in a range of 12.0 to 22.0 [Nm] in a state in which the tube fitting is in contact with the testing ringlike portion and a disconnect operation for loosening the tube fitting after the fastening operation to disconnect the testing tube is repeated n times (where 1<n<6), a maximum axial force occurring in a first fastening test is defined as an initial axial force $F_1$ in kN, a maximum axial force occurring in an n-th fastening test is defined as an n-th axial force $F_n$ in kN, and a value obtained by $-(F_n-F_1)/(n-1)$ is defined as an axial force decrease rate α [kN/test round], the range of the fitting average plating thickness t is set so that $10.0<F_1<14.0$ and $0<\alpha<1.75$ are true.

BRIEF DESCRIPTION OF DRAWINGS

FIG. 10 is a drawing showing a table of test samples.

FIG. 13 is a drawing showing test results of a fastening test.

FIG. 14 is a drawing in which evaluation results are compiled and pass samples and fail samples are organized.

DESCRIPTION OF EMBODIMENTS

Figure 1:
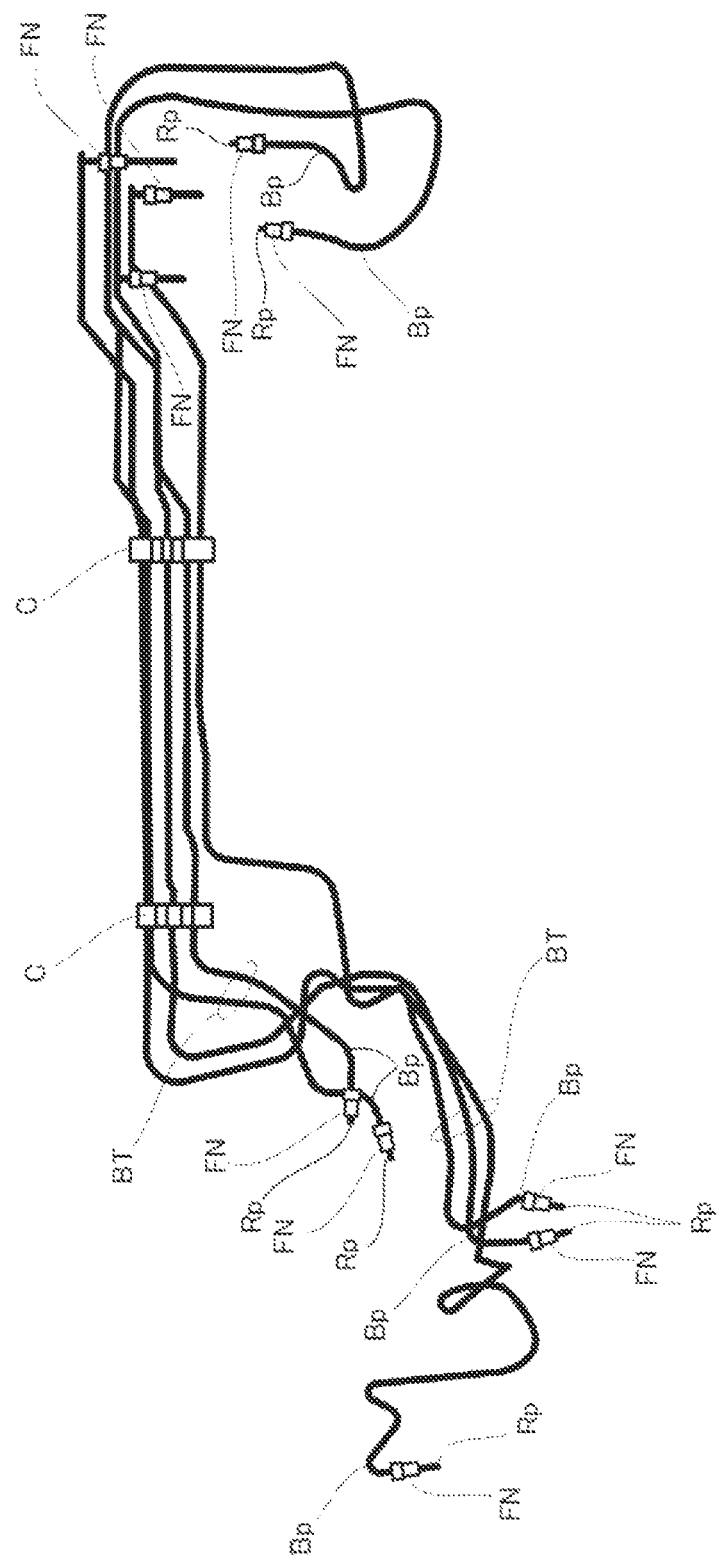
FIG. 1 is a drawing showing a state in which multiple brake tubes that have been fitted with tube fittings and bent are assembled.

When constituent elements are denoted using the same reference signs in the drawings, this means that they are the same or similar constituent elements. It will be noted that in the embodiments described below, redundant description and reference signs are sometimes omitted.

As an example, automobile brake tubes are used as tubing to transmit pressure generated by a master cylinder to brake units provided for each wheel. In many cases, an ABS unit and/or an ESC unit is provided between the master cylinder and the brake units, and brake tubes are also used to interconnect these units. Multiple brake tubes having different tube diameters are selected in accordance with various conditions such as pressure resistance conditions required between these units.

As shown in FIG. 1, multiple brake tubes BT are bundled together with plastic clamps C, for example, and bent in accordance with the layout of the bottom portion of the automobile to form an assembled product that is supplied to an automobile assembly line. For each brake tube BT, a double-layer tube made from a metal sheet material such as sheet steel and having excellent compressive strength to withstand the operating pressure of the brakes is used. In the case of a brake tube, as an example, a tube having an outer diameter φ in a range of 4.76 to 8.00 [mm] is selected. Each brake tube BT is fitted with a flare nut FN that conforms to the outer diameter thereof. On the automobile assembly line, workers collectively connect the brake tubes BT by fastening the flare nuts FN fitted to each brake tube BT to the aforementioned units with the same prescribed tightening torque.

An end-forming process for high-pressure use is performed on the end of each brake tube BT in a state in which the flare nut FN is fitted to it. Examples of the end-forming process for high-pressure use include an end-forming process for forming a ring-shaped portion Rp such as an ISO flare prescribed by the International Organization for Standardization (ISO) and a double flare prescribed by the Japanese Automotive Standards Organization (JASO). Each brake tube BT undergoes the end-forming process for forming the ring-shaped portion Rp and a bending process for forming a bend portion Bp in a state in which the flare nut FN is fitted to its outer periphery. For that reason, the flare nut FN is prevented, by the ring-shaped portion Rp and the bend portion Bp provided at a position away from the ring-shaped portion Rp, from coming off of the brake tube BT.

First Embodiment

Figure 2:
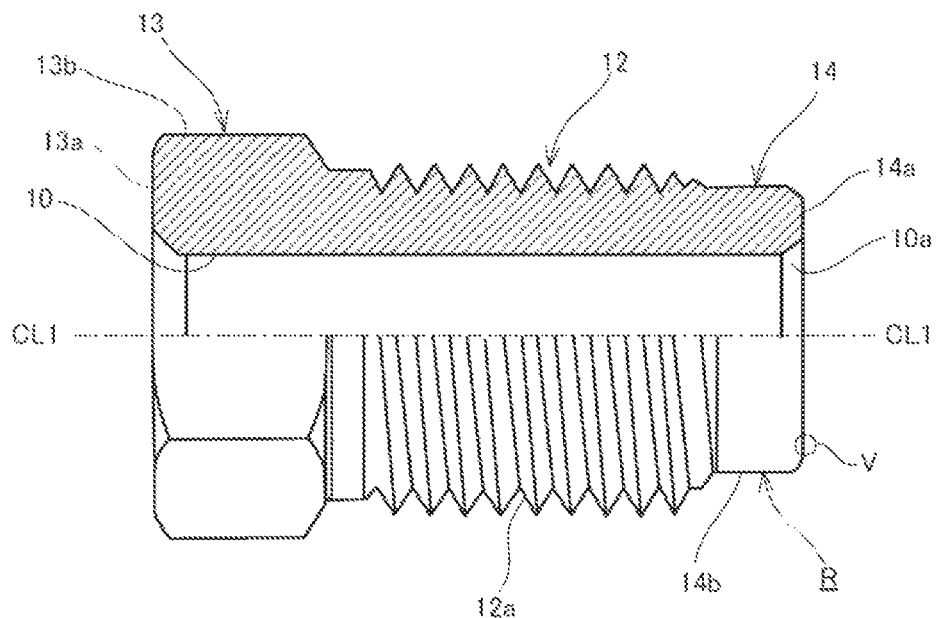
FIG. 2 is a drawing showing a flare nut, which is an example of a tube fitting.

FIG. 2 shows a flare nut 1A that is suitable for an ISO flare. The flare nut 1A corresponds to an example of the tube fitting of this disclosure. The flare nut 1A is a hollow tube fitting in which is formed a through hole 10 into which a tube can be inserted. The flare nut 1A includes a threaded portion 12 in which male threads 12a are formed, a head portion 13 that is provided at one end side of the threaded portion 12, and a contact portion 14 that is provided at another end side of the threaded portion 12. The head portion 13, the threaded portion 12, and the contact portion 14 are penetrated by the through hole 10 extending in a center line CL1 direction.

The through hole 10 of the flare nut 1A shown in the drawings has a shape having a constant inner diameter in its axial direction; however, for example, instead of the through hole 10, the through hole can be changed to one having the shape of a stepped hole whose inner diameter changes at predetermined places in its axial direction.

The male threads 12a formed in the threaded portion 12 are, as an example, ISO standard metric coarse threads and mate with female threads 12b (see FIG. 4) formed in a mating member. However, the male threads 12a may also, as an example, be changed to metric fine threads of the same standard. Fine threads have a smaller lead angle than coarse threads, so by changing the threads to fine threads, a flare nut that is less likely to loosen with the same axial force can be provided. It will be noted that in terms of the size of the threaded portion 12 of the flare nut 1A applied to the brake tube BT, threads that are larger in size tend to be used the larger the outer diameter of the tube to which the flare nut is fitted is. Barring special circumstances, it is common in terms of its size for the threaded portion 12 to have a nominal diameter in a range of M10 to M14, that is, to have an outer diameter in a range of 10.0 to 14.0 [mm]. It will be noted that when inch-based threads are provided in the flare nut 1A, threads with a nominal diameter in a range of ⅜" to ½" (about 9.53 to 12.7 [mm]) are used. Consequently, the male threads 12a that can be used for the flare nut 1A have an outer diameter in a range of 9.53 to 14.0 [mm].

The head portion 13 is where the tightening torque is input during fastening, and has a standardized hexagonal shape so that it can be fastened with a common tool such as a flare nut wrench. The head portion 13 includes a hollow circular flat surface 13a that faces the axial direction and six side surfaces 13b with which the tool mates. The flat surface 13a corresponds to an example of a first plane, and any one of the six side surfaces 13b corresponds to an example of a second plane. The size of the head portion 13 is selected in accordance with the size of the threaded portion 12, but unlike in the case of a head portion of a standardized bolt, it is made common to some extent to reduce the number of tool changes.

The contact portion 14 is provided at the end portion on the right side in FIG. 2 along the center line CL1, in other words, on the end portion on the advancing direction side of the male threads 12a during fastening. The contact portion 14 has the function of contacting a ring-shaped portion 16 (see FIG. 3) formed as an ISO flare and simultaneously pressing the ring-shaped portion 16 against the mating member during fastening to the mating member. The contact portion 14 includes a contact surface 14a that contacts the ring-shaped portion 16 and a hollow cylinder portion 14b that extends from the threaded portion 12 to the end portion side. At the boundary between the contact portion 14 and the through hole 10, a chamfered portion 10a that slopes about 45° with respect to the center line CL1 direction is provided. The chamfered portion 10a mitigates interference between the tube exterior and the flare nut 1A during fastening and concentration of stress at the boundary between the through hole 10 and the contact portion 14. It will be noted that the chamfered portion 10a has a conical surface that appears in a cross-section relating to the center line CL1 and has a straight ridge line. Instead of the chamfered portion 10a, a processed portion having a curved surface whose ridge line is a curve described by one or plural circular arcs that are convex toward the center may also be provided.

The inner diameter of the contact portion 14 is determined by the inner diameter of the through hole 10. An inner diameter d of the contact portion 14 is, for example, set to 4.98 [mm] when the outer diameter φ of the brake tube BT is 4.76 [mm], 6.24 [mm] when the outer diameter φ is 6.0 [mm], 6.59 [mm] when the outer diameter φ is 6.35 [mm], and 8.29 [mm] when the outer diameter φ is 8.0 [mm]. The inner diameter d of the contact portion 14 is, as an example, allowed an error of +0.15 [mm]. Consequently, the contact portion 14 that can be used for the flare nut 1A has an inner diameter d in a range of 4.98 to 8.44 [mm].

Figure 3:
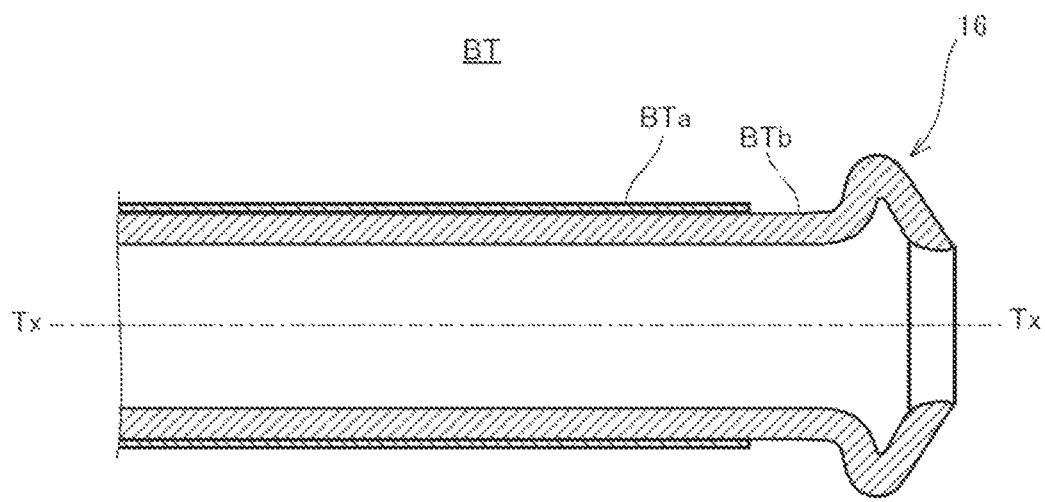
FIG. 3 is a drawing showing a brake tube in which an ISO flare, which is an example of a ring-shaped portion, is formed in its end.

As shown in FIG. 3, the ring-shaped portion 16 is formed in the end of the brake tube BT. An example of a procedure for forming the ring-shaped portion 16 is as follows. First, a resin coating layer BTa of the brake tube BT is stripped from the end of the brake tube BT over a predetermined range in a tube axis Tx direction all the way around in its circumferential direction. Next, the ring-shaped portion 16 in the shape of an ISO flare projecting outward in the tube radial direction orthogonal to the tube axis Tx is formed in the end portion of a stripped portion BTb from which the resin coating layer has been stripped. It will be noted that, depending on the resin material of the resin coating layer BTa, there are also cases where the ring-shaped portion 16 is formed in the end portion of the brake tube BT without stripping the resin coating layer BTa.

Figure 4:
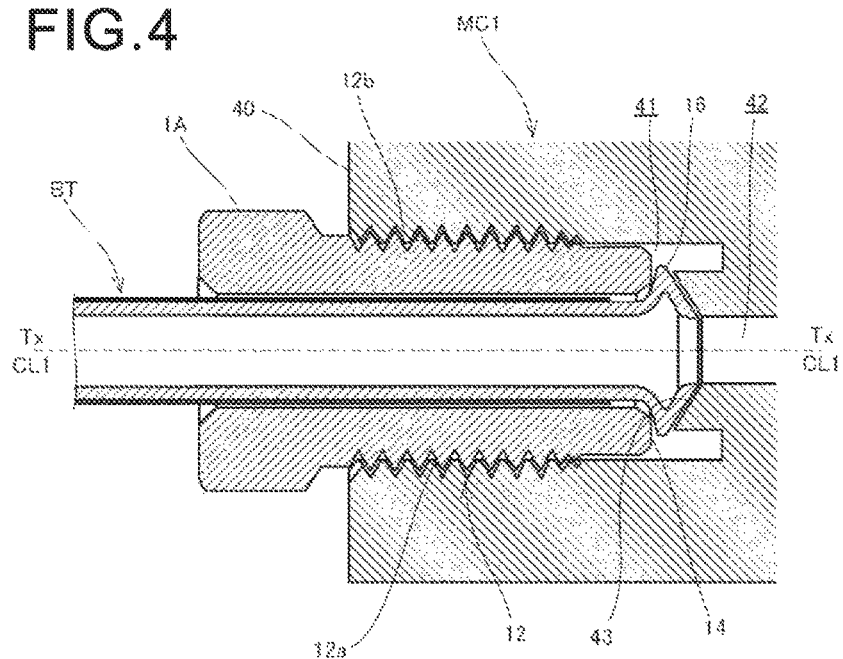
FIG. 4 is a drawing showing a state in which the brake tube is connected to a master cylinder, which is an example of a mating member.

As an example of the use of the flare nut 1A, a case where the brake tube BT is connected to a master cylinder MC1 will be described with reference to FIG. 4. The master cylinder MC1, which is an example of the mating member, has a housing 40. In the housing 40, an insertion hole 41 into which is inserted the brake tube BT is formed. The insertion hole 41 opens to the outside of the housing 40, and the opposite side of the opening communicates with a fluid passage 42 formed in the housing 40. The fluid passage 42 opens at a bottom portion 43 of the insertion hole 41. The bottom portion 43 is formed in a shape set rearward toward the device interior so as to conform to the shape of the ring-shaped portion 16 of the brake tube BT. In the inner peripheral surface of the housing 40 in which the insertion hole 41 is formed, female threads 12b that mate with the male threads 12a of the flare nut 1A are formed.

First, with the flare nut 1A moved away from the end of the brake tube BT, the brake tube BT is inserted so that the ring-shaped portion 16 of the brake tube BT hits the bottom portion 43 of the insertion hole 41. In that state the flare nut 1A is moved toward the insertion hole 16, and the male threads 12a of the threaded portion 12 and the female threads 12b of the housing 40 are caused to mate with each other. When the flare nut 1A is rotated in the fastening direction, the contact portion 14 comes into contact with the ring-shaped portion 16. Then, when the flare nut 1A is tightened while the contact portion 14 is in contact with the ring-shaped portion 16, the ring-shaped portion 16 is pressed against the bottom portion 43 by the contact portion 14. While the flare nut 1A is thus being tightened, the ring-shaped portion 16 is sandwiched between the contact portion 14 and the bottom portion 43 and gradually deforms while transitioning from elastic deformation to plastic deformation. Because of this, the brake tube BT is liquid-tightly connected to the master cylinder MC1. The connection force of the brake tube BT is determined by a maximum axial force that acts during this fastening operation.

Figure 5:
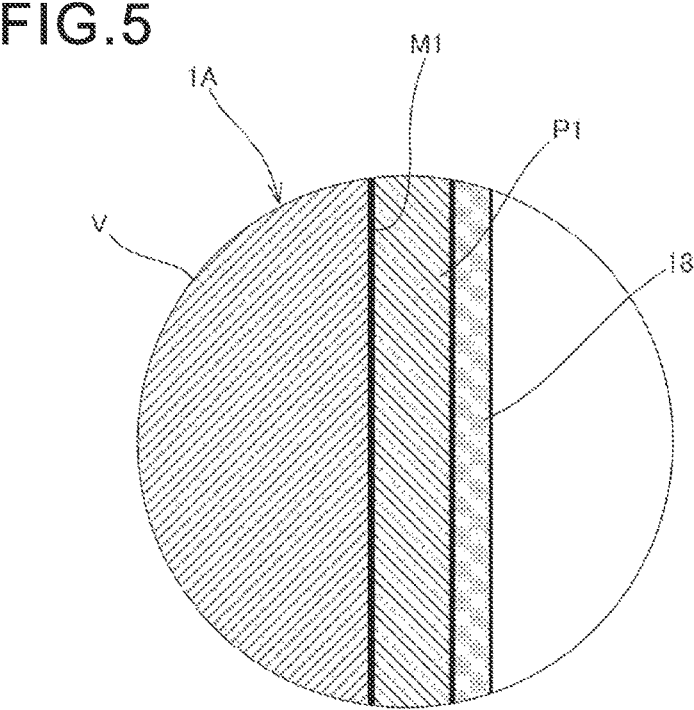
FIG. 5 is an enlarged sectional view of a portion V of FIG. 2.

In order to rigidly connect the brake tube BT, as shown in FIG. 5, the flare nut 1A is provided with a resin coating layer 18 to increase or stabilize the axial force during fastening. The flare nut 1A has a zinc-based plated layer P1 formed on a metal base M1. Moreover, the resin coating layer 18 is provided on the plated layer P1. The resin coating layer 18 is positioned at the outermost surface at an outer side of the plated layer P1. It will be noted that different types of resin layers may also be provided between the plated layer P1 and the resin coating layer 18, for example, as long as the resin coating layer 18 is positioned at the outermost surface. To form the plated layer P1, any of zinc plating, zinc-iron alloy plating, or zinc-nickel alloy plating may be performed. In this embodiment, a zinc-nickel alloy plated layer is provided as the plated layer P1. The plated layer P1 is provided on the entire surface of the metal base M1. The plated layer P1 covers the surfaces of the threaded portion 12, the head portion 13, and the contact portion 14 and the inner peripheral surface of the through hole 10 that penetrates them.

It will be noted that a conversion coating may be applied to the plated layer P1. The plated layer P1 in this case includes a conversion coating layer on its outside. However, depending, for example, on the composition of the conversion coating layer, it may be difficult to check even when observed with a microscope. The conversion coating layer enhances adhesion between the plated layer P1 and the resin coating layer 18. The conversion coating layer may include metal atoms selected from titanium, zirconium, molybdenum, tungsten, vanadium, manganese, nickel, cobalt, chromium, and lead. Furthermore, some of these metal atoms may also be included in the conversion coating layer as compounds such as oxides. The conversion coating layer may also be a chromium-free chemical conversion coating layer. The conversion coating process for forming the conversion coating layer may be reactive or applied, and may be a trivalent chromium conversion coating or a chromium-free conversion coating.

The plated layer P1 is formed by electrolytic plating. An untreated nut with its metal base M1 exposed is dipped in a plating bath including zinc and nickel metal ions. The thickness of the coating deposited on the metal base M1 of the untreated nut is controlled by adjusting at least one of current density, defined as the current per unit area during the plating process, and process time.

In the case of electrolytic plating, the thickness of the coating formed on the product to be plated is not uniform because the current density changes in accordance with the shape of the product to be plated. For example, if the product to be plated includes not only an area with few changes in shape, such as a flat surface or a cylindrical surface, but also an area with a large change in shape, such as a projecting jag or a cusp on the surface, the thickness of the coating differs in each area. In the case of the flare nut 1A also, the thickness of the plated layer P1 differs when the crests and the roots of the threads of the threaded portion 12 are compared and when the crests and the contact surface 14a of the contact portion 14 are compared. For example, when the thickness of the plated layer P1 is compared between the crests of the threads of the threaded portion 12 and the contact surface 14a of the contact portion 14, the thickness at the crests has tended to be smaller than the thickness at the contact surface 14a.

As described later, it was found that the mechanical properties of the flare nut 1A change when the thickness of the plated layer P1 differs. However, because the thickness of the plated layer P1 differs depending on the area of the flare nut 1A, the correlation between the thickness of the plated layer P1 and mechanical properties such as axial force cannot be accurately evaluated. Thus, the thickness of the plated layer P1 is quantitatively controlled or managed using a later-described fitting average plating thickness calculated by a predetermined method.

The resin coating layer 18 is at least formed in a coating region R that includes the surfaces of the threaded portion 12 and the contact portion 14 (see FIG. 2). As an example, the coating region R is set on the entire surface of the flare nut 1A. That is, the coating region R is set on the surfaces of the threaded portion 12, the head portion 13, and the contact portion 14 of the flare nut 1A and the inner peripheral surface of the flare nut 1A penetrated by the through hole 10. The resin coating layer 18 includes a polyethylene-based substance, a lubricant, and solid particles. The resin coating layer 18 is formed by adhering a coating agent C that includes these as components to the coating region R. As the polyethylene-based substance, for example, polyethylene or a polyethylene copolymer can be selected. As the lubricant, for example, any one, or an arbitrary combination of, polyethylene wax, molybdenum disulfide, graphite, or boron nitride can be selected. The lubricant may be a solid or a liquid. Furthermore, as the solid particles, for example, any one, or an arbitrary combination, of silicon dioxide, silicon nitride, or titanium nitride can be selected.

The resin coating layer 18 is formed by dip coating as an example. Instead of this method, for example, the resin coating layer 18 may also be formed by spray coating, in which the coating agent is atomized and sprayed. Spray coating is suitable when forming the resin coating layer 18 partially on the flare nut 1A. It will be noted that the coefficient of friction of the resin coating layer 18 is smaller than the coefficient of friction of the plated layer P1.

Second Embodiment

Figure 6:
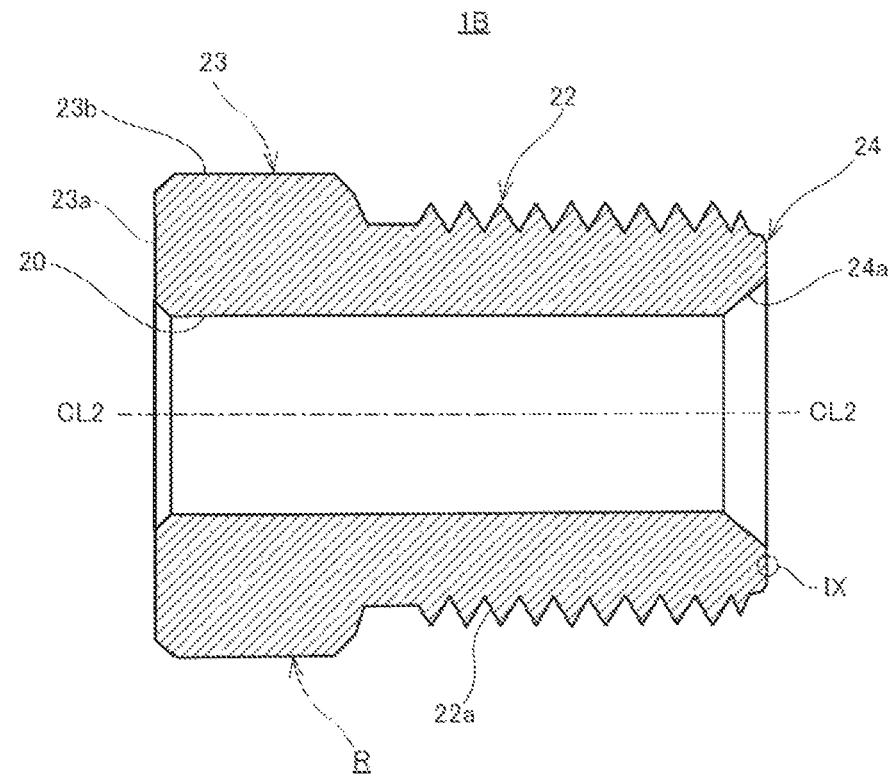
FIG. 6 is a drawing showing a flare nut, which is another example of a tube fitting.

FIG. 6 shows a flare nut 1B that is suitable for a double flare. The flare nut 1B corresponds to an example of the tube fitting of this disclosure. The flare nut 1B is a hollow tube fitting in which is formed a through hole 20 into which a tube can be inserted. The flare nut 1B includes a threaded portion 22 in which male threads 22a are formed, a head portion 23 that is provided at one end side of the threaded portion 22, and a contact portion 24 that is provided at another end side of the threaded portion 22. The head portion 23, the threaded portion 22, and the contact portion 24 are penetrated by the through hole 20 extending in a center line CL2 direction. In the case of the flare nut 1B, the through hole 20 has a shape having a constant inner diameter in its axial direction; however, for example, instead of the through hole 20, the through hole can be changed to one having the shape of a stepped hole whose inner diameter changes at predetermined places in its axial direction.

The male threads 22a formed in the threaded portion 22 have the same specifications as the male threads 12a provided at the threaded portion 12 of the flare nut 1A of the first embodiment, and the male threads 22a that can be used for the flare nut 1B have an outer diameter in the range of 9.53 to 14.0 [mm]. Furthermore, the specifications of the head portion 23 are also the same as the specifications of the head portion 13 of the flare nut 1A. The head portion 23 includes a hollow circular flat surface 23a that faces the axial direction and six side surfaces 23b with which a tool mates. The flat surface 23a corresponds to an example of a first plane, and any one of the six side surfaces 23b corresponds to an example of a second plane. The specifications of the contact portion 24 are also the same as the specifications of the contact portion 14 of the flare nut 1A, and the contact portion 24 that can be used for the flare nut 1B has an inner diameter d in the range of 4.98 to 8.44 [mm].

The contact portion 24 is provided at the end portion on the right side in FIG. 6 along the center line CL2, in other words, on the end portion on the advancing direction side of the male threads 22a during fastening. The contact portion 24 has the function of contacting a ring-shaped portion 26 (see FIG. 7) formed as a double flare and simultaneously pressing the ring-shaped portion 26 against the mating member during fastening to the mating member. In the case of the flare nut 1B, the contact portion 24 is provided near the terminal end of the threaded portion 22. The flare nut 1B has no distinct hollow cylinder portion like the cylindrical portion 14b of the flare nut 1A (see FIG. 2). However, there is also a flare nut suitable for a double flare which includes a hollow cylinder portion corresponding to the cylindrical portion 14b. The contact portion 24 has a conical contact surface 24a having an angle of inclination of about 42° with respect to the axial direction.

Figure 7:
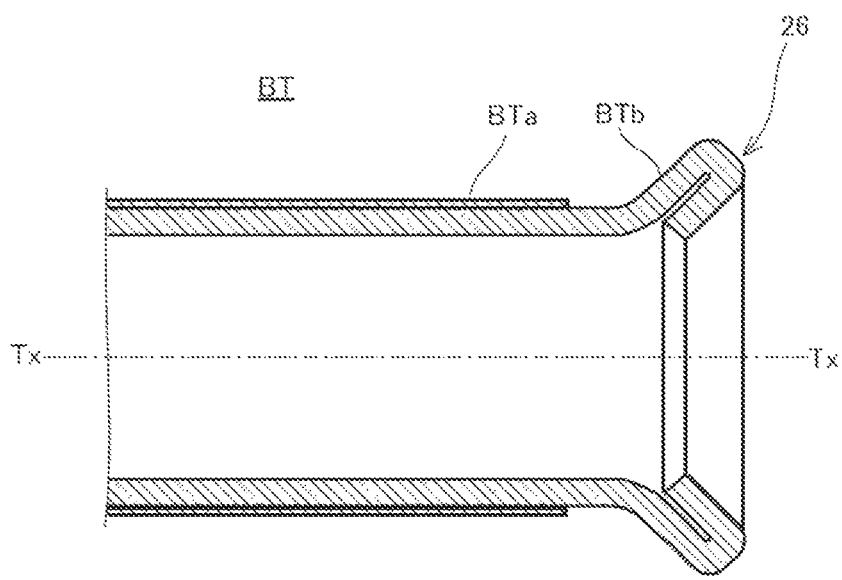
FIG. 7 is a drawing showing a brake tube in which a double flare, which is another example of a ring-shaped portion, is formed in its end.

As shown in FIG. 7, the ring-shaped portion 26 is formed in the end of the brake tube BT. An example of a procedure for forming the ring-shaped portion 26 is as follows. First, a resin coating layer BTa of the brake tube BT is stripped from the end of the brake tube TB over a predetermined range in the tube axis Tx direction all the way around in its circumferential direction. Next, the ring-shaped portion 26 in the shape of a double flare projecting outward in the tube radial direction orthogonal to the tube axis Tx is formed in the end portion of a stripped portion BTb from which the resin coating layer BTa has been stripped. It will be noted that, depending on the resin material of the resin coating layer BTa, there are also cases where the ring-shaped portion 26 is formed in the end portion of the brake tube BT without stripping the resin coating layer BTa.

Figure 8:
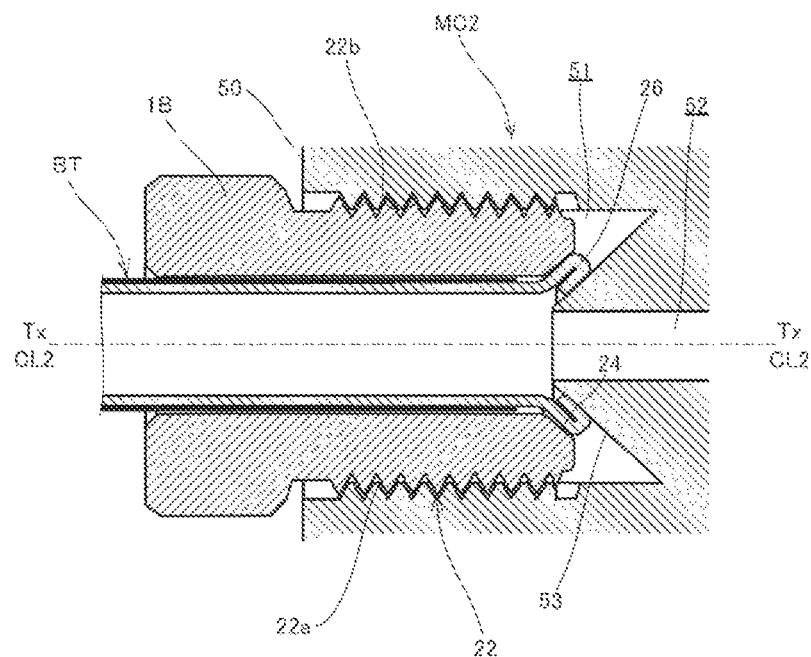
FIG. 8 is a sectional view showing part of a master cylinder, which is an example of a mating member to which the brake tube of FIG. 7 is connected.

In the mating member to which the brake tube BT in which the ring-shaped portion 26 is formed becomes connected, an insertion hole 51 with the structure shown in FIG. 8 is formed. For example, the insertion hole 51 is formed in a master cylinder MC2, which is an example of the mating member. The insertion hole 51 opens to the outside of a housing 50, and the opposite side of the opening communicates with a fluid passage 52 formed in the housing 50. The fluid passage 52 opens to a bottom portion 53 of the insertion hole 51. The bottom portion 53 is formed in a shape projecting toward the device exterior so as to conform to the shape of the ring-shaped portion 26 of the brake tube BT. In the inner peripheral surface of the housing 50 in which the insertion hole 51 is formed, female threads 22b that mate with the male threads 22a of the flare nut 1B are formed. The connection of the brake tube BT using the flare nut 1B is the same as in the case of the flare nut 1A, so description thereof will be omitted.

Figure 9:
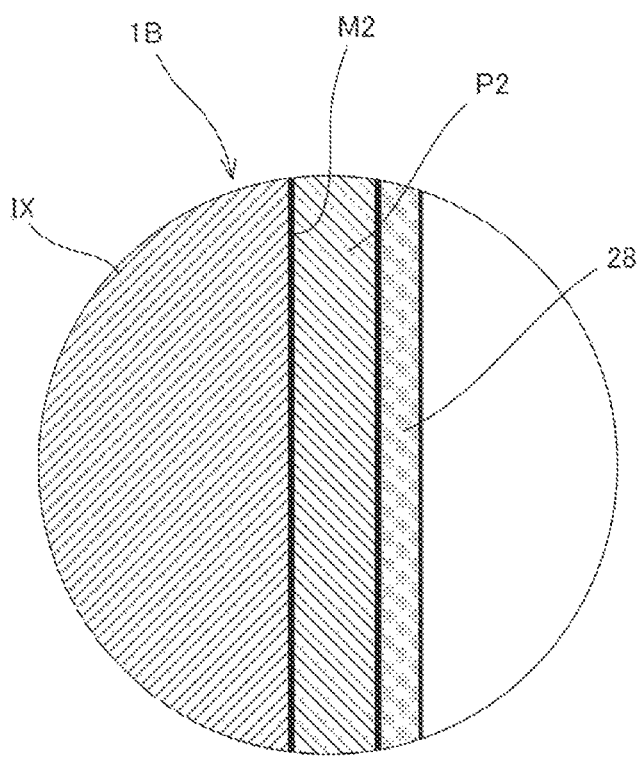
FIG. 9 is an enlarged sectional view of a portion IX of FIG. 6.

As shown in FIG. 9, the flare nut 1B is provided with a resin coating layer 28. The flare nut 1B has a zinc-based plated layer P2 formed on a metal base M2. Moreover, the resin coating layer 28 is provided on the plated layer P2. The resin coating layer 28 is positioned at the outermost surface at an outer side of the plated layer P2. It will be noted that different types of resin layers may also be provided between the plated layer P2 and the resin coating layer 28, for example, as long as the resin coating layer 28 is positioned at the outermost surface. To form the plated layer P2, any of zinc plating, zinc-iron alloy plating, or zinc-nickel alloy plating may be performed. In this embodiment, a zinc-nickel alloy plated layer is provided as the plated layer P2. The plated layer P2 is provided on the entire surface of the metal base M2. The plated layer P2 covers the surfaces of the threaded portion 22, the head portion 23, and the contact portion 24 and the inner peripheral surface of the through hole 20 that penetrates them. The plated layer P2 may also include a conversion coating layer on the outside. As in the first embodiment, for example, the plated layer P2 is formed by electrolytic plating, and the resin coating layer 28 is formed by dip coating. It will be noted that the coefficient of friction of the resin coating layer 28 is smaller than the coefficient of friction of the plated layer P2.

EXAMPLES

By repeatedly fastening the flare nuts 1A and 1B with the same tightening torque and unfastening them, the axial force during fastening has tended to decrease with an increase in the number of times the flare nuts 1A and 1B are repeatedly fastened and unfastened. Additionally, from the fastening test described below, it was found that the thickness of the zinc-based plated layer is a factor that affects the axial force decrease rate. It will be noted that because no significant difference was found between the flare nut 1A and the flare nut 1B in the test results of the fastening test, the results of the test implemented in regard to the flare nut 1A are disclosed below.

1. Test Samples (1) Preparation of Test Samples

As shown in FIG. 10, plural samples with mutually different fitting average plating thicknesses t [μm] described later were prepared with respect to three types of flare nuts with different shapes and sizes. A zinc-nickel alloy plated layer was used as an example of the plated layer of each sample. Furthermore, the fitting average plating thicknesses t were made different from each other by adjusting at least one of the current density and the process time during the plating of each sample. Namely, the parameters that control the fitting average plating thickness t are current density and process time.

The resin coating layer of each sample was formed by adhering, to the coating region, either one of two types of coating agents C1 and C2 that included the polyethylene-based substance, lubricant, and solid particles and had mutually different viscosities at 25[° C.]. As the method of forming the resin coating layer, dip coating was used. The thickness of the resin coating layer was managed using a mass per unit area w [g/m$^2$] described later that correlates with the thickness. The mass per unit area w of each sample was adjusted within a range of 0.79<w<10.07.

(2) Fitting Average Plating Thickness

Due to the characteristics of electrolytic plating, the thickness of the plated layer is not uniform over the areas of the flare nut. It was found that the thickness of the plated layer affects the mechanical properties of the flare nut, such as axial force. Thus, the thickness of the plated layer is quantitatively controlled or managed using the fitting average plating thickness t [μm]. The fitting average plating thickness t is calculated as follows.

Figure 11A:
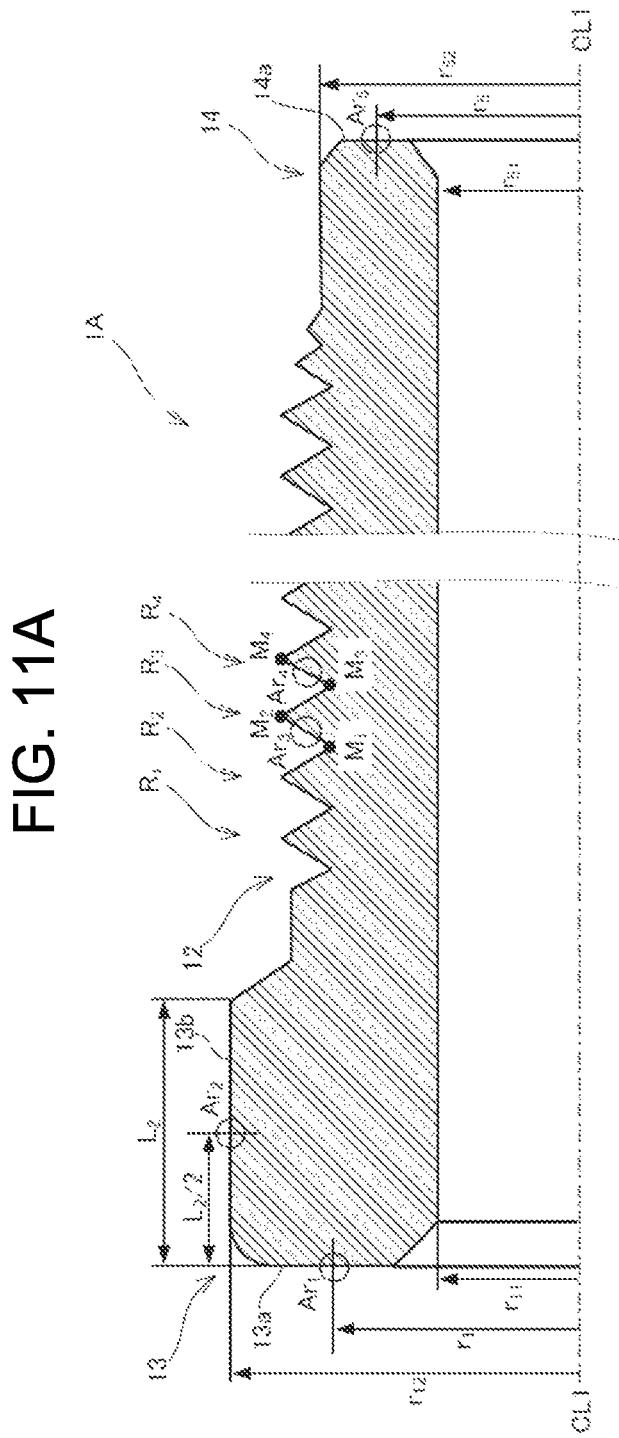
FIG. 11A is a drawing showing a cross-section serving as a reference for measuring the thickness of a plated layer of the flare nut pertaining to a first embodiment.

FIG. 11A shows a cross-section of the flare nut 1A that passes through the center line CL1 and is orthogonal to any two of the six side surfaces 13b of the head portion 13. The fitting average plating thickness t is calculated by measuring the thickness of the plated layer at various places appearing in this cross-section.

(a) Counting from a head portion 13 side the number of threads $R_i$ (where i=1, 2, 3, 4, etc.) configuring the male threads 12a, the first is defined as a first thread $R_1$, the second is defined as a second thread $R_2$, the third is defined as a third thread $R_3$, and the fourth is defined as a fourth thread $R_4$.

(b) The following five areas $Ar_i$ (where i=1, 2, 3, 4, 5) are set.

(b1) First Area $Ar_1$

The first area $Ar_1$ is an area set on the flat surface 13a of the head portion 13. As shown in FIG. 11A, when denotes the distance from the center line CL1 to the inner peripheral surface of the through hole 10 and $r_{12}$ denotes the distance from the center line CL1 to the side surface 13b, the first area $Ar_1$ is set within a circle with a radius of 100 [μm] centered on a position located a distance of $r_1=(r_{11}+r_{12})/2$ from the center line CL1.

(b2) Second Area $Ar_2$

The second area $Ar_2$ is an area set on the side surface 13b of the head portion 13. As shown in FIG. 11A, when $L_2$ denotes the distance from the flat surface 13a to the end portion of the side surface 13b, the second area $Ar_2$ is set within a circle with a radius of 100 [μm] centered on a position located a distance of $L_2/2$ from the flat surface 13a.

(b3) Third Area $Ar_3$

The third area $Ar_3$ is set within a circle with a radius of 100 [μm] centered on the midpoint of a trailing flank of the third thread $R_3$.

(b4) Fourth Area $Ar_4$

The fourth area $Ar_4$ is set within a circle with a radius of 100 [μm] centered on the midpoint of a trailing flank of the fourth thread $R_4$.

(b5) Fifth Area $Ar_5$

Figure 11B:
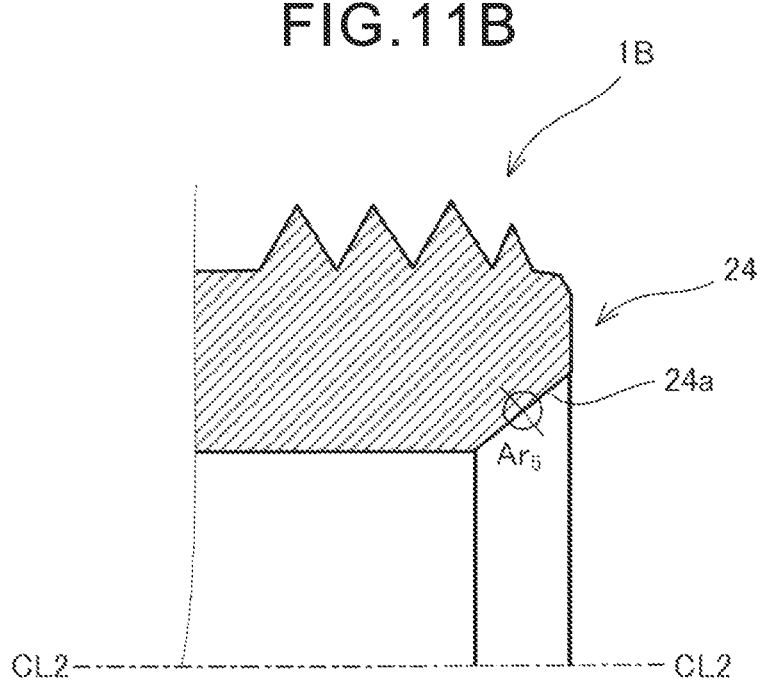
FIG. 11B is a drawing showing part of a cross-section serving as a reference for measuring the thickness of a plated layer of the flare nut pertaining to a second embodiment.

The fifth area $Ar_5$ is an area set on the contact surface 14a of the contact portion 14. As shown in FIG. 11A, when $r_{51}$ denotes the distance from the center line CL1 to the inner peripheral surface of the through hole 10 (the inner diameter of the contact portion 14) and $r_{52}$ denotes the distance from the center line CL1 to the outer peripheral surface of the contact portion 14, the fifth area $Ar_5$ is set within a circle with a radius of 50 [μm] centered on a position located a distance of $r_5=(r_{51}+r_{52})/2$ from the center line CL1. It will be noted that in the case of the flare nut 1B, the first area $Ar_1$ to the fourth area $Ar_4$ are set in the way as in the flare nut 1A, but the fifth area $Ar_5$ is set as shown in FIG. 11B. FIG. 11B shows part of a cross-section of the flare nut 1B that passes through the center line CL2 and is orthogonal to any two of the six side surfaces 23b of the head portion 23. The fifth area $Ar_5$ in this case is set within a circle with a radius of 100 [μm] centered on the midpoint of the contact surface 24a of the contact portion 24 appearing in this cross-section.

Figure 11C:
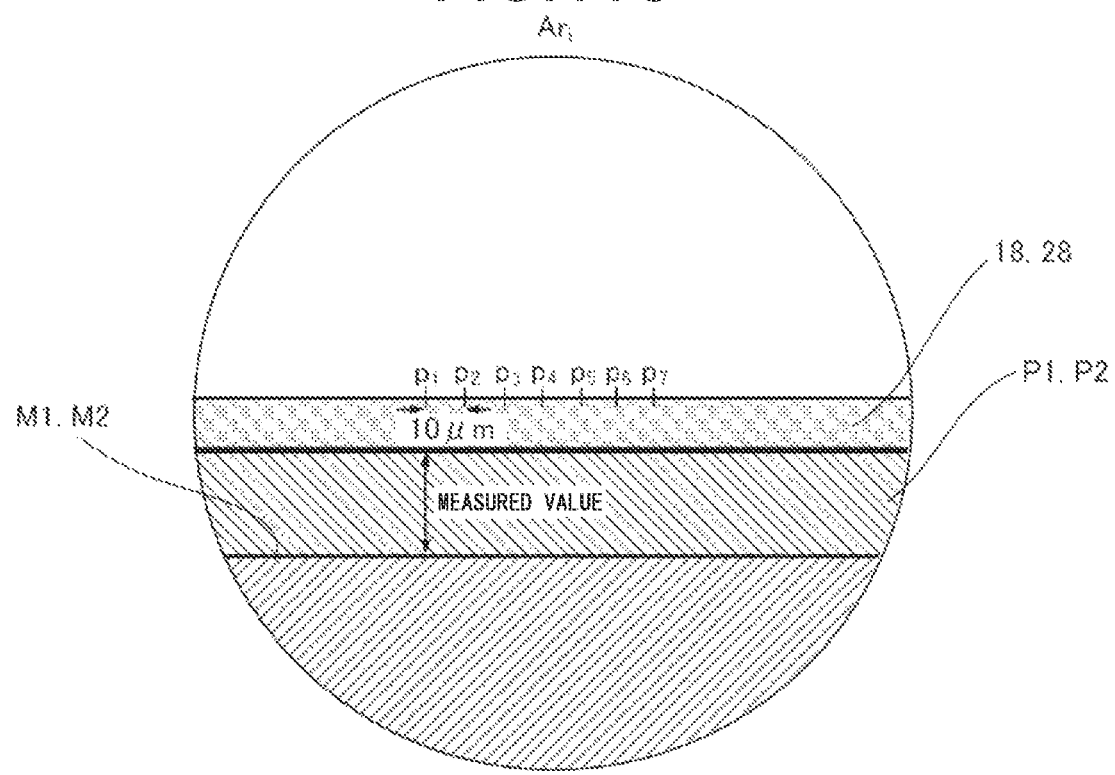
FIG. 11C is a drawing showing a method of measuring the thickness of the plated layer in each area.

(c) In each of the areas $Ar_i$ set in (b), as shown in FIG. 11C, the thickness of the plated layer is measured at seven points $p_1$ to $p_7$ forming a line in one direction at 10 [μm] intervals, and the arithmetic mean of these seven measured values is calculated for each of the areas $Ar_i$. Because of this, five calculated values $X_1$, $X_2$, $X_3$, $X_4$, and $X_5$ corresponding to the five areas $Ar_i$ are acquired.

(d) The thickness of the plated layer is measured at a root $M1_1$ between the second thread $R_2$ and the third thread $R_3$, a crest $M_2$ of the third thread $R_3$, a root $M_3$ between the third thread $R_3$ and the fourth thread $R_4$, and a crest $M_4$ of the fourth thread $R_4$. Four measured values $T_1$, $T_2$, $T_3$, and $T_4$ corresponding to these places $M_1$ to $M_4$ are acquired.

(e) The fitting average plating thickness t is calculated based on the following equation 1.

$$t=(X_1+X_2+X_3+X_4+X_5+T_1+T_2+T_3+T_4)/9 \qquad 1$$

(f) When measuring the thickness of the plated layer, first, the actual flare nut 1A or flare nut 1B is cut in its longitudinal direction with a cutter. During this cutting, the cutting position of the cutting blade is slightly offset in the radial direction from the center line so that the flare nut is not excessively polished beyond the center line of the actual flare nut in a polishing step described later. Because of this, polishing allowance is ensured and a measurement piece slightly larger than half is obtained. Next, the measurement piece is molded with resin so as to cover it. It is ensured that the orientation of the cut surface of the measurement piece can be known even after molding. Next, the resin-molded measurement piece is surface-polished with a grinder until the cross-section including the center line shown in FIG. 11A or FIG. 11B appears. Then, places in the cross-section appearing as a result of the measurement piece being polished are imaged at a magnification of 1000 to 2500 times using the following digital microscope as an example, and the thickness of the plated layer is measured based on the captured images.

Model number: OLYMPUS $DSX_510$

Manufacturer: Olympus Corporation (3) Calculation of Mass Per Unit Area

The thickness of the resin coating layer correlates with the mass of the substance adhering to the coating region. Thus, as a physical quantity correlating with the thickness of the resin coating layer, a value obtained by dividing the mass difference resulting from the presence or absence of the resin coating layer by the surface area of the coating region is defined as the mass per unit area w $[g/m^2]$. This mass per unit area w was used to quantify the thickness of the resin coating layer.

The mass per unit area w was calculated by dividing the mass difference between the mass of the flare nut before the resin coating process and the mass of the flare nut after the formation of the resin coating layer by the total surface area of the flare nut. It will be noted that, conversely to this method, the mass per unit area w may also be calculated by dividing the mass difference between the mass of the flare nut on which the resin coating layer has been formed and the mass of the flare nut after the resin coating layer has been removed by the total surface area of the flare nut. Examples of methods for removing the resin coating layer include a method where the flare nut on which the resin coating layer has been formed is dipped in a high-temperature organic solvent, then the dipped flare nut is washed with an organic solvent separately prepared for washing, and then the flare nut is dried. As the organic solvent in which the flare nut is dipped, for example, an organic solvent capable of dissolving polyethylene, such as benzene and decalin, can be used. The dipping time and the drying time are set to an extent that the flare nut from which the resin coating layer has been removed can be identified with the flare nut before the resin coating process. For example, the dipping time in the organic solvent may be 5 hours, and, after the flare nut has been washed with the organic solvent for washing, the drying time may be 1 hour. The flare nut from which the resin coating layer has been removed by this process can be identified with the flare nut before the resin coating process.

The total surface area of the flare nut was calculated, based on design drawing data for the flare nut, using a surface area calculation function that is part of CAD software. By utilizing this function, the surface area can be calculated for an arbitrary range of the flare nut. It will be noted that although there may be slight differences in the calculated value of the surface area depending on the CAD software, those differences are negligible for calculating the mass per unit area w which is calculated to two places after the decimal point. Furthermore, error between the value calculated by the CAD software and a value calculated based on measurement data obtained by three-dimensionally measuring the external dimensions of the actual flare nut is also of an extent that is similarly negligible.

(4) Sample Numbers

As shown in FIG. 10, each sample was assigned a sample number from #101 to #209 to distinguish them from each other. It will be noted that the first digit of the sample number was assigned in correspondence to the types of the coating agents C1 and C2.

2. Fastening Test Method (1) Axial Force Measurement Device

Figure 12:
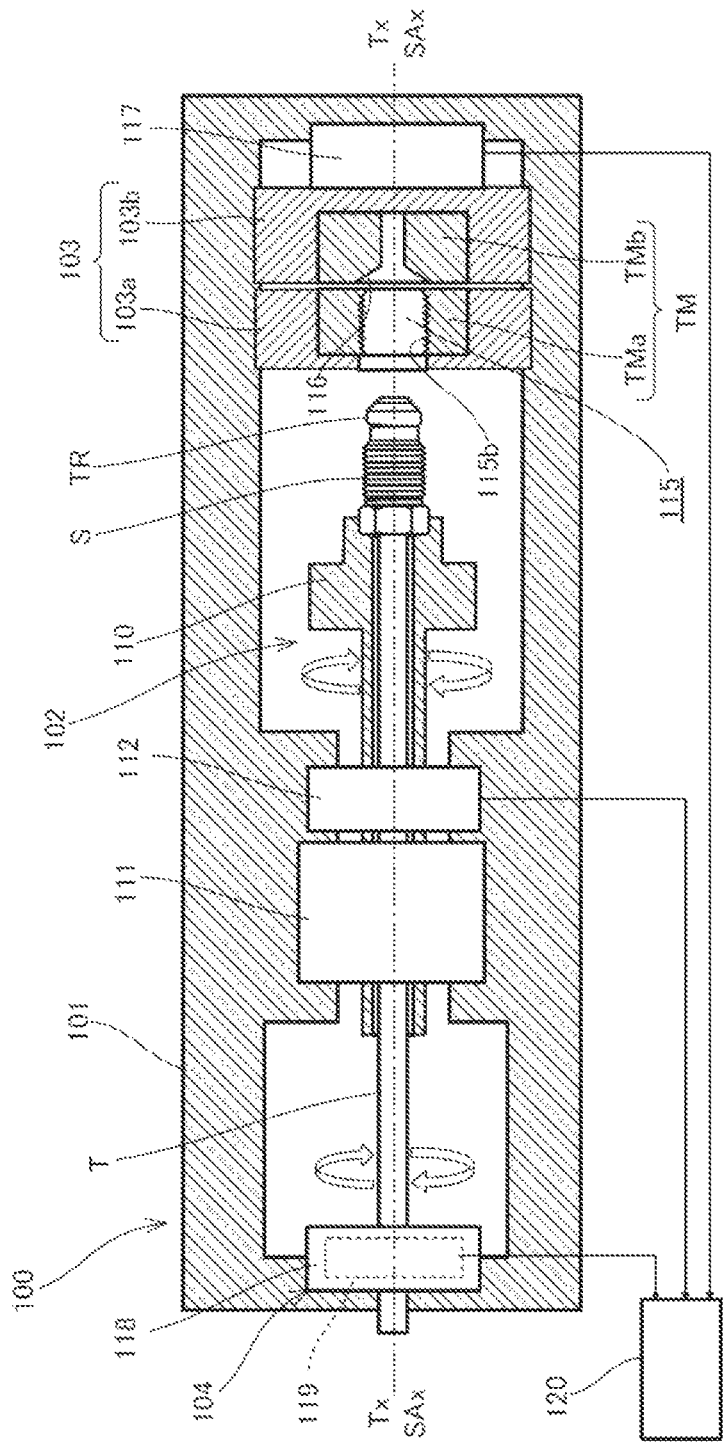
FIG. 12 is a drawing showing the configuration of an axial force measurement device.

An axial force measurement device shown in FIG. 12 was used to measure the axial force of each sample. FIG. 12 schematically shows the configuration of an axial force measurement device 100. In the axial force measurement device 100 is set a testing tube T corresponding to the brake tube BT. The testing tube T is set in the axial force measurement device 100 so that its tube axis Tx coincides with a standard axis SAx. A flare nut sample S is fitted to the testing tube T, and a testing ringlike portion TR is formed in the end of the testing tube T. The axial force measurement device 100 performs a tightening operation on the sample S until a predetermined tightening torque is reached, and thereby connects the testing tube T to a testing member TM corresponding to the mating member. The axial force measurement device 100 measures the axial force and other physical quantities of the sample S in the process of the tightening operation.

The axial force measurement device 100 includes a frame 101, and the frame 101 is installed on the floor of a test room or the like as an example. The frame 101 of the axial force measurement device 100 is provided with a tightening operation unit 102 that performs the tightening operation on the sample S, a mating member holding unit 103 that holds the testing member TM, and a tube holding unit 104 that holds the testing tube T. The tightening operation unit 102, the mating member holding unit 103, and the tube holding unit 104 are provided in the frame 101 so as to form a line in the standard axis Sax direction.

The tightening operation unit 102 includes a tool 110 that becomes fitted together with the head portion of the sample S, a motor 111 that drives the tool 110 to rotate about the standard axis SAx, and a tightening torque sensor 112 that outputs a signal corresponding to the drive resistance of the tool 110.

The mating member holding unit 103 holds the testing member TM with a first jig 103a and a second jig 103b that are divided in the standard axis Sax direction. The testing member TM is divided in the standard axis Sax direction, with one first part TMa thereof being held in the first jig 103a and another second part TMb thereof being held in the second jig 103b. The first part TMa has a threaded hole 115 in which are formed female threads 115b that mate with male threads of the sample S. The second part TMb has a bottom portion 116 against which is pressed the testing ringlike portion TR of the testing tube T. When the threaded hole 115 and the bottom portion 116 are concentrically butted against each other, they form a hole shape corresponding to the insertion holes 41 and 51. The first jig 103a and the second jig 103b can hold the first part TMa and the second part TMb in a state in which the threaded hole 115 and the bottom portion 116 are concentrically butted against each other. The first jig 103a is fixed to the frame 101. The second jig 103b is restrained in the standard axis SAx direction in a state in which the first part TMa and the second part TMb are butted against each other and a load cell 117 is interposed.

The tube holding unit 104 includes a fixing mechanism 118, which clamps the testing tube T at a fixing position thereof set at a predetermined distance (e.g., 0.3 [m]) from the end of the testing tube T, and a corotation torque sensor 119, which outputs a signal according to the torque about the standard axis SAx occurring in the fixing mechanism 118.

When the tightening operation is performed on the sample S by the tightening operation unit R10111102, the sample S advances while mating with the female threads 115b formed in the first part TMa of the testing member TM, and the testing ringlike portion TR is pressed against the bottom portion 116 formed in the second part TMb. Because of this, a force that separates the first part TMa and the second part TMb from each other in the standard axis SAx direction acts on them. The first part TMa cannot move in the standard axis SAx direction because it is held in the first jig 103a that is fixed to the frame 101, and the second part TMb is restrained in the standard axis SAx direction, in a state in which the load cell 117 is interposed, because it is held in the second jig 103b. Consequently, the load that acts on the second part TMb corresponds to a reaction force of the axial force of the sample S, so the value detected by the load cell 117 can be treated as the measured value of the axial force. Namely, the axial force of the sample S can be directly measured based on the output signal of the load cell 117 without relying on a calculation based on the tightening torque. Signals from the tightening torque sensor 112, the load cell 117, and the corotation torque sensor 119 are each input to a control device 120. The control device 120 may be a personal computer as an example. The control device 120 executes predetermined processing on the signals input from each of the sensors, stores, as measurement results, data in which the axial force and the corotation torque are associated with the tightening torque that was input to the sample S, and can as needed output the measurement results to output means such as a display for example.

(2) Test Method

Using the axial force measurement device 100 shown in FIG. 12, an unused sample S was fitted to an unused testing tube T, the fastening operation was performed, and thereafter a disconnect operation for loosening the sample with the tightening operation unit 102 and disconnecting the testing tube T from the testing member TM was performed. It will be noted that it was determined that the testing tube T was disconnected when the value detected by the load cell 117 returned to its initial value (e.g., 0.0 [kN]). The tightening torque during fastening by the tightening operation unit 102 was set to a value in a range of 12.0 [Nm] to 22.0 [Nm] as an example, such as 17.0 [Nm] for example. The above operations formed a first fastening test, and the fastening test including the tightening operation, the measurement of the axial force and the like, and the disconnect operation was repeated a total of five times without replacing the testing tube T and the sample S. In each fastening test, the axial force and the corotation torque were acquired and recorded as measured values by the axial force measurement device 100. The interval between each fastening test was set to 60 [sec] as an example.

It will be noted that the number of times the fastening test was repeated was determined based on the limit for the number of times the brake tube of an automobile is detached during the period of time from when the automobile is new to when the automobile reaches the end of its life. Although the brake tube of an automobile is not often detached, the limit was estimated based on a discrete probability distribution using the number of times the brake tube is detached as a random variable. Here, assuming three elements—the ABS unit, the master cylinder, and the brake units—to be mating members to which the brake tube is connected, it was a precondition that the flare nut would invariably be reused when there is a fault in any of these three elements, and consideration was given to the probability of occurrence of a fault in any of the three elements, the number of places where the brake tube is connected, the average value of the period of time from when an automobile is new to when an automobile reaches the end of its life, and other parameters. Because of this, it was estimated that the probability that the number of times the brake tube is detached would be 6 times or exceed 6 times was so low as to be negligible. Therefore, the number of times the fastening test was repeated was 5 times, which is less than 6 times.

(3) Axial Force Decrease Rate

As a parameter for evaluating the change in axial force caused by repeating the fastening test on the same flare nut, an axial force decrease rate α [kN/test round] was defined by the following equation 2.

$$\alpha = -(F_n - F_1)/(n-1) \qquad 2$$

Here, $F_1$ in kN is the initial axial force, which is a maximum axial force generated in the first fastening test. $F_n$ in kN is the n-th axial force, which is a maximum axial force generated in the n-th (where 1<n<6) fastening test. However, equation 2 is conditional on $0<F_n<F_n-1$ being true when $F_n-1$ is the (n−1)-th axial force generated the (n−1)-th time. Consequently, α>0.

As described above, because the number of times the fastening test was repeated was set to n=5, which is less than 6 times, equation 2 defining the axial force decrease rate α can be rewritten as the following equation 2' assuming that F5 denotes the fifth axial force.

$$\alpha = -(F_5 - F_1)/4 \qquad 2'$$

3. Test Results and Evaluation

FIG. 13 shows the test results of the fastening tests that were conducted as described above.

(1) Evaluation Criteria

Each sample was evaluated according to the following criterion a and criterion b based on the mechanical properties of flare nuts.

Criterion a: The initial axial force $F_1$ exceeds 10.0 [kN] and is less than 14.0 [kN].

Criterion b: The axial force decrease rate α is less than 1.75 [kN/test round].

Criterion a defines the range of the initial axial force $F_1$. The upper limit value for criterion a was determined based on the upper limit value for the corotation torque. The upper limit value for the corotation torque is determined in consideration of the strength of the tube and vibration of the vehicle, and, as an example, is 1.0 [Nm]. The corotation torque and the axial force are correlated, and the axial force corresponding to the upper limit value for the corotation torque is uniquely determined. That axial force is, as an example, 14.0 [kN]. The corotation torque was at a maximum during the initial fastening accompanied by plastic deformation of the ring-shaped portion formed in the tube, decreased starting from when the flare nut was reused, and tended to not change much over the number of times the flare nut was reused. Consequently, because the axial force is less than the upper limit value for criterion a, it is guaranteed that the corotation torque will be less than the upper limit value even when the flare nut is reused. The lower limit value for criterion a is set so that the connection force required of the tube can be ensured even when the axial force decreases when the flare nut is reused. That axial force is, as an example, 10.0 [kN]. Consequently, because the axial force exceeds the lower limit value for criterion a, the connection force required of the tube can be ensured even when the flare nut is reused.

Criterion b defines the upper limit value for the axial force decrease rate α. If, as an example, the axial force decrease rate α becomes equal to or greater than 1.75 [kN/test round], when the flare nut is reused the axial force often falls below the lower limit value even when the flare nut is fastened with the same tightening torque as when it was initially fastened. The lower limit value for the axial force is set based on the lower limit value for the connection force required of the brake tube. Because the axial force decrease rate α conforms to criterion b, when the flare nut is reused the axial force can be kept from falling below the lower limit value even when the flare nut is fastened with the same tightening torque as when it was initially fastened. Because of this, the connection force required of the brake tube can be ensured even when the flare nut is reused. It will be noted that the smaller the axial force decrease rate α is, the better, conditional on α>0.

(2) Evaluation Results

FIG. 14 shows the evaluation results. In this figure, the samples are arranged in order beginning with the one with the smallest fitting average plating thickness t to the one with the largest, and pass samples that met both criterion a and criterion b and fail samples that failed to meet at least one of criterion a and criterion b are compiled. It will be noted that in FIG. 14 "y" indicates cases where the samples met criterion a or criterion b and "n" indicates cases where the samples did not meet criterion a or criterion b. Furthermore, "YES" indicates cases where the samples met both criterion a and criterion b and "NO" indicates cases where the samples did not meet at least one of criterion a and criterion b.

(3) Considerations

As can be understood from FIG. 14, whether or not criterion a and criterion b are met depends on the fitting average plating thickness t, irrespective of the difference in the coating agents. As the fitting average plating thickness t increases, generally the initial axial force $F_1$ and the axial force decrease rate α tend to decrease. Conversely, as the fitting average plating thickness t decreases, generally the initial axial force $F_1$ and the axial force decrease rate α tend to increase. It was found that when the fitting average plating thickness t is too large, criterion a is not met, and when the fitting average plating thickness t is too small, criterion b is not met.

Surveying the pass samples, one sees that the fitting average plating thickness t of each pass sample is in a range of 2.1<t<19.7. The smaller the initial axial force $F_1$ is, the more that damage to the tube can be reduced while ensuring the connection force required of the tube. Furthermore, considering mass production of the flare nut, it is advantageous in terms of production costs for the thickness of the plated layer to be as small as possible. Thus, considering not only mechanical properties but also damage to the tube and the production costs of the flare nut, the upper limit value for the fitting average plating thickness t is, for example, preferably less than 16.0 [μm], more preferably less than 14.0 [μm], and even more preferably less than 12.0 [μm]. That is, the fitting average plating thickness t is preferably 2.1<t<16.0, more preferably 2.1<t<14.0, and even more preferably 2.1<t<12.0.

The present disclosure is not limited to the above embodiments and can be implemented by various embodiments. In each of the above embodiments, the flare nuts are used on a metal brake tube, but the use target of the flare nuts is not limited to a brake tube. For example, various types of metal tubes, such as vapor tubes, can also serve as the use target of the flare nuts. Each of the flare nuts 1A and 1B is only an example of a tube fitting used to connect a metal tube. The present disclosure can also be applied to flare nuts having different shapes from the ones shown in the drawings as long as the male threads have an outer diameter of 9.53 to 14.0 [mm] and the contact portion has an inner diameter of 4.98 to 8.44 [mm].

Examples of zinc-based plating include, in addition to zinc-nickel alloy plating, zinc plating and zinc-iron alloy plating. In order to satisfy the mechanical properties required of the flare nut, the fitting average plating thickness t must be within the above range. Consequently, the type of zinc-based plating may also be selected in accordance with the corrosion resistance performance required in accordance with the application of the flare nut.

The coating region R pertaining to the above embodiments is set on the entire surface of the flare nut—that is, the entireties of the surfaces of the threaded portion, the head portion, and the contact portion—and the inner peripheral surface of the flare nut penetrated by the through hole. However, setting the coating region on the entire surface is only an example. For example, the coating region may also be set only on the surface of the threaded portion and the surface of the contact portion. In this case, the inner peripheral surface of the flare nut penetrated by the through hole and the surface of the head portion are excluded from the coating region. Furthermore, the coating region is not limited to being set on the entireties of each surface of the threaded portion and the contact portion. For example, the coating region may also be set on parts of each surface of the threaded portion and the contact portion. In this case, as an example, the coating region may be set on preferably 40% or more, more preferably 60% or more, and even more preferably 80% or more of the surface of the threaded portion. Furthermore, the coating region may be set on preferably 40% or more, more preferably 60% or more, and even more preferably 80% of the surface of the contact portion. "Surface of the threaded portion" means the surface in the thread formation range that actually mates with the female threads or is expected to mate with the female threads. Furthermore, "surface of the contact portion" means the contact surface that actually contacts the ring-shaped portion or is expected to contact the ring-shaped portion.

Inventions that can be identified from the above embodiments and the example modifications thereof are disclosed below. It will be noted that in order to facilitate understanding of the present disclosure, the reference signs and drawing numbers used in the description of the above embodiments are given in parentheses, but the present disclosure is not limited to the shapes and structures of the configurations shown in the drawings.

A tube fitting of the present disclosure is a tube fitting (1A, 1B) that is fitted to an outer periphery of a metal tube (BT) having, at an end portion thereof, a ring-shaped portion (Rp, 16, 26) projecting outward in a tube radial direction, and which is, by being fastened to a mating member (MC1, MC2) in a state in which the tube fitting is in contact with the ring-shaped portion, capable of connecting the tube to the mating member, the tube fitting including: a threaded portion (12, 22) in which are formed male threads (12a, 22a) that mate with female threads (12b, 22b) provided at the mating member; a head portion (13, 23) that is provided at one end side of the threaded portion and to which a tightening torque is input during fastening; a contact portion (14, 24) that is provided at another end side of the threaded portion and is for contacting the ring-shaped portion and simultaneously pressing the ring-shaped portion against the mating member during fastening to the mating member; a zinc-based plated layer (P1, P2) that is provided at the threaded portion, the head portion, and the contact portion; and a resin coating layer (18, 28) that is positioned at an outermost surface at the outer side of the zinc-based plated layer and includes a polyethylene-based substance, a lubricant, and solid particles, wherein the through hole (10, 20) extends through the threaded portion, the head portion, and the contact portion, in a direction parallel to an advancing direction of the male threads during fastening, the male threads of the threaded portion have an outer diameter of 9.53 to 14.0 [mm], the head portion includes a first plane (13a, 23a) facing an opposite direction from the advancing direction and a second plane (13b, 23b) orthogonal to the first plane, the contact portion includes a contact surface (14a, 24a) capable of contacting the ring-shaped portion and has an inner diameter of 4.98 to 8.44 [mm], and in a case of, counting from a head portion side the number of threads ($R_i$) configuring the male threads in a cross-section (the cross-section of FIG. 11A or FIG. 11B) that includes a center line (CL1, CL2) extending in the same direction as the through hole and is orthogonal to the second plane of the head portion, a first thread is defined as the first thread ($R_1$), a second thread is defined as the second thread ($R_2$), a third thread is defined as the third thread ($R_3$), and a fourth thread is defined as the fourth thread ($R_4$), a first area ($Ar_1$) set in the first plane of the head portion, a second area ($Ar_2$) set in the second plane of the head portion, a third area ($Ar_3$) set on a trailing flank of the third thread, a fourth area ($Ar_4$) set on a trailing flank of the fourth thread, and a fifth area ($Ar_5$) set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1$, $T_2$, $T_3$, and $T_4$ denote four measured values obtained by measuring the thickness of the zinc-based plated layer at each of a root ($M_1$) between the second thread and the third thread, a crest ($M_2$) of the third thread, a root ($M_3$) between the third thread and the fourth thread, and a crest ($M_4$) of the fourth thread in the cross-section, $2.1 < t < 19.7$ is true.

According to this tube fitting, $2.1 < t < 19.7$ is true in regard to the fitting average plating thickness t correlating with the thickness of the zinc-based plated layer provided on the tube fitting, so when the tube fitting is repeatedly fastened and unfastened, an initial axial force where the corotation torque is less than an upper limit value can be obtained and the axial force decrease rate can be kept low.

In one aspect of the tube fitting of the disclosure, when, in a case in which a testing member (TM) corresponding to the mating member and a testing tube (T) with a same outer diameter as the tube and having a testing ringlike portion (TR) corresponding to the ring-shaped portion are prepared and a fastening test including a fastening operation for fastening the tube fitting to the testing member with a predetermined tightening torque in a state in which the tube fitting is in contact with the testing ringlike portion and a disconnect operation for loosening the tube fitting after the fastening operation to disconnect the testing tube is repeated n times (where $1 < n < 6$), a maximum axial force occurring in the first fastening test is defined as an initial axial force $F_1$ in kN, a maximum axial force occurring in the n-th fastening test is defined as an n-th axial force $F_n$ in kN, and a value obtained by $-(F_n-F_1)/(n-1)$ is defined as an axial force decrease rate α [kN/test round], $0 < α < 1.75$ may be true. According to this aspect, $0 < α < 1.75$ is true in regard to the axial force decrease rate α, so a decrease in the axial force when the tube fitting is reused can be inhibited, and the desired connection force is obtained when the tube fitting is reused even when the tube fitting is fastened with the same tightening torque as when the tube fitting was initially used.

In this aspect, the tube may be a brake tube used for brake tubing in an automobile, and in a case in which the tightening torque is 12.0 to 22.0 [Nm], $10.0<F_1<14.0$ may be true. In this case, it is guaranteed that the upper limit value for the corotation torque will not be exceeded, so damage to the brake tube can be avoided and loosening of the tube fitting can be prevented from being caused.

A tube equipped with a tube fitting of the present disclosure includes: a metal tube (BT) having, at an end portion thereof, a ring-shaped portion (Rp, 16, 26) projecting outward in a tube radial direction and having a bend portion (Bp) at a position away from the ring-shaped portion; and a tube fitting (1A, 1B) that is fitted to an outer periphery of the tube in a state in which the tube fitting is prevented from coming off by the ring-shaped portion and the bend portion, and which is, by being fastened to a mating member in a state in which the tube fitting is in contact with the ring-shaped portion, capable of connecting the tube to the mating member, wherein the tube fitting includes a threaded portion (12, 22) in which are formed male threads (12a, 22a) that mate with female threads (12b, 22b) provided at the mating member, a head portion (13, 23) that is provided at one end side of the threaded portion and to which a tightening torque is input during fastening, a contact portion (14, 24) that is provided at another end side of the threaded portion and is for contacting the ring-shaped portion and simultaneously pressing the ring-shaped portion against the mating member during fastening to the mating member, a zinc-based plated layer (P1, P2) that is provided at the threaded portion, the head portion, and the contact portion, and a resin coating layer (18, 28) that is positioned at an outermost surface at the outer side of the zinc-based plated layer and includes a polyethylene-based substance, a lubricant, and solid particles, the threaded portion, the head portion, and the contact portion are penetrated by a through hole (10, 20) extending in a direction parallel to an advancing direction of the male threads during fastening, the male threads of the threaded portion have an outer diameter of 9.53 to 14.0 [mm], the head portion includes a first plane (13a, 23a) facing the opposite direction from the advancing direction and a second plane (13b, 23b) orthogonal to the first plane, the contact portion includes a contact surface (14a, 24a) capable of contacting the ring-shaped portion and has an inner diameter of 4.98 to 8.44 [mm], and in a case of, counting from the head portion side the number of threads ($R_i$) configuring the male threads in a cross-section (the cross-section of FIG. 11A or FIG. 11B) that includes a center line (CL1, CL2) extending in the same direction as the through hole and is orthogonal to the second plane of the head portion, a first thread is defined as the first thread ($R_1$), a second thread is defined as the second thread ($R_2$), a third thread is defined as the third thread ($R_3$), and a fourth thread is defined as the fourth thread ($R_4$), a first area ($Ar_1$) set in the first plane of the head portion, a second area ($Ar_2$) set in the second plane of the head portion, a third area ($Ar_3$) set on a trailing flank of the third thread, a fourth area (Ara) set on a trailing flank of the fourth thread, and a fifth area ($Ar_5$) set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1, X_2, X_3, X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1, T_2, T_3$, and $T_4$ denote four measured values obtained by measuring the thickness of the zinc-based plated layer at each of a root ($M_1$) between the second thread and the third thread, a crest ($M_2$) of the third thread, a root ($M_3$) between the third thread and the fourth thread, and a crest (Ma) of the fourth thread in the cross-section, $2.1<t<19.7$ is true.

According to this tube equipped with a tube fitting, there can be provided a tube equipped with a tube fitting with which the requisite mechanical properties when the tube fitting is reused can be ensured.

In one aspect of the tube equipped with a tube fitting, when, in a case in which a testing member (TM) corresponding to the mating member and a testing tube (T) with the same outer diameter as the tube and having a testing ringlike portion (TR) corresponding to the ring-shaped portion are prepared and a fastening test including a fastening operation for fastening the tube fitting to the testing member with a predetermined tightening torque in a state in which the tube fitting is in contact with the testing ringlike portion and a disconnect operation for loosening the tube fitting after the fastening operation to disconnect the testing tube is repeated n times (where $1<n<6$), a maximum axial force occurring in the first fastening test is defined as an initial axial force $F_1$ in kN, a maximum axial force occurring in an n-th fastening test is defined as an n-th axial force $F_n$ in kN, and a value obtained by $-(F_n-F_1)/(n-1)$ is defined as an axial force decrease rate α [kN/test round], $0<α<1.75$ may be true. According to this aspect, $0<α<1.75$ is true in regard to the axial force decrease rate α, so a decrease in the axial force when the tube fitting is reused can be inhibited, and the desired connection force is obtained when the tube fitting is reused even when the tube fitting is fastened with the same tightening torque as when the tube fitting was initially used.

In this aspect, the tube may be a brake tube used for brake tubing in an automobile, and in a case in which the tightening torque is in a range of 12.0 to 22.0 [Nm], $10.0<F_1<14.0$ may be true. In this case, $10.0<F_1<14.0$ is true in regard to the initial axial force $F_1$, so it is guaranteed that the upper limit value for the corotation torque will not be exceeded, and damage to a tube used for brake tubing can be avoided and loosening of the tube fitting can be prevented from being caused.

Another tube fitting of the present disclosure is a tube fitting (1A, 1B) that is fitted to an outer periphery of a metal tube (BT) having, at an end portion thereof, a ring-shaped portion (Rp, 16, 26) projecting outward in a tube radial direction, and which is, by being fastened to a mating member (MC1, MC2) in a state in which the tube fitting is in contact with the ring-shaped portion, capable of connecting the tube to the mating member, the tube fitting including: a threaded portion (12, 22) in which are formed male threads (12a, 22a) that mate with female threads (12b, 22b) provided at the mating member; a head portion (13, 23) that is provided at one end side of the threaded portion and to which a tightening torque is input during fastening; a contact portion (14, 24) that is provided at another end side of the threaded portion and is for contacting the ring-shaped portion and simultaneously pressing the ring-shaped portion against the mating member during fastening to the mating member; a zinc-based plated layer (P1, P2) that is provided at the threaded portion, the head portion, and the contact portion; and a resin coating layer (18, 28) that is positioned at an outermost surface at the outer side of the zinc-based plated layer and includes a polyethylene-based substance, a lubricant, and solid particles, wherein the threaded portion, the head portion, and the contact portion are penetrated by a through hole (10, 20) extending in a direction parallel to an advancing direction of the male threads during fastening, the male threads of the threaded portion have an outer diameter of 9.53 to 14.0 [mm], the head portion includes a first plane (13a, 23a) facing the opposite direction from the advancing direction and a second plane (13b, 23b) orthogonal to the first plane, the contact portion includes a contact surface (14a, 24a) capable of contacting the ring-shaped portion and has an inner diameter of 4.98 to 8.44 [mm], in a case of, counting from the head portion side the number of threads ($R_i$) configuring the male threads in a cross-section (the cross-section of FIG. 11A or FIG. 11B) that includes a center line (CL1, CL2) extending in the same direction as the through hole and is orthogonal to the second plane of the head portion, a first thread is defined as the first thread ($R_1$), a second thread is defined as the second thread ($R_2$), a third thread is defined as the third thread ($R_3$), and a fourth thread is defined as the fourth thread ($R_4$), a first area ($Ar_1$) set in the first plane of the head portion, a second area ($Ar_2$) set in the second plane of the head portion, a third area ($Ar_3$) set on a trailing flank of the third thread, a fourth area (Ara) set on a trailing flank of the fourth thread, and a fifth area ($Ar_5$) set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 [μm] intervals in each of the first area to the fifth area and $T_1$, $T_2$, $T_3$, and $T_4$ denote four measured values obtained by measuring the thickness of the zinc-based plated layer at each of a root ($M_1$) between the second thread and the third thread, a crest ($M_2$) of the third thread, a root ($M_3$) between the third thread and the fourth thread, a the crest ($M_4$) of the fourth thread in the cross-section, and in a case in which a testing member (TM) corresponding to the mating member and a testing tube (T) with the same outer diameter as the tube and having a testing ringlike portion (TR) corresponding to the ring-shaped portion are prepared and a fastening test including a fastening operation for fastening the tube fitting to the testing member with a tightening torque in a range of 12.0 to 22.0 [Nm] in a state in which the tube fitting is in contact with the testing ringlike portion and a disconnect operation for loosening the tube fitting after the fastening operation to disconnect the testing tube is repeated n times (where 1<n<6), a maximum axial force occurring in the first fastening test is defined as an initial axial force $F_1$ in kN, a maximum axial force occurring in the n-th fastening test is defined as an n-th axial force $F_n$ in kN, and a value obtained by $-(F_n-F_1)/(n-1)$ is defined as an axial force decrease rate α [kN/test round], the range of the fitting average plating thickness t is set so that $10.0<F_1<14.0$ and $0<\alpha<1.75$ are true.

According to this aspect, $0<\alpha<1.75$ is true in regard to the axial force decrease rate α, so a decrease in the axial force when the tube fitting is reused can be inhibited, and the desired connection force is obtained when the tube fitting is reused even when the tube fitting is fastened with the same tightening torque as when the tube fitting was initially used. Moreover, $10.0<F1<14.0$ is true in relation to the initial axial force $F_1$, so it is guaranteed that the upper limit value for the corotation torque will not be exceeded, and damage to a tube used for brake tubing can be avoided and loosening of the tube fitting can be prevented from being caused.

In one aspect of the tube fitting, the range of the fitting average plating thickness t may be 2.1<t<19.7. According to this aspect, when the tube fitting is repeatedly fastened and unfastened, an initial axial force where the corotation torque is less than an upper limit value can be obtained and the axial force decrease rate can be kept low.

A tube fitting plating thickness measurement method of the present disclosure is a tube fitting plating thickness measurement method applied to a tube fitting that is fitted to an outer periphery of a metal tube (BT) having, at an end portion thereof, a ring-shaped portion (Rp, 16, 26) projecting outward in a tube radial direction, and which is, by being fastened to a mating member (MC1, MC2) in a state in which the tube fitting is in contact with the ring-shaped portion, capable of connecting the tube to the mating member, and which is plated, the tube fitting including a threaded portion (12, 22) in which are formed male threads (12a, 22a) that mate with female threads (12b, 22b) provided at the mating member, a head portion (13, 23) that is provided at one end side of the threaded portion and to which a tightening torque is input during fastening, a contact portion (14, 24) that is provided at another end side of the threaded portion and is for contacting the ring-shaped portion and simultaneously pressing the ring-shaped portion against the mating member during fastening to the mating member, and a plated layer (P1, P2) that is provided at the threaded portion, the head portion, and the contact portion, with the threaded portion, the head portion, and the contact portion being penetrated by a through hole (10, 20) extending in a direction parallel to an advancing direction of the male threads during fastening, the male threads of the threaded portion having an outer diameter of 9.53 to 14.0 [mm], the head portion including a first plane (13a, 23a) facing the opposite direction from the advancing direction and a second plane (13b, 23b) orthogonal to the first plane, and the contact portion including a contact surface (14a, 24a) capable of contacting the ring-shaped portion and having an inner diameter of 4.98 to 8.44 [mm], the method including: a step of, in a case of, counting from the head portion side the number of threads (Ri) configuring the male threads in a cross-section (the cross-section of FIG. 11A or FIG. 11B) that includes a center line (CL1, CL2) extending in the same direction as the through hole and is orthogonal to the second plane of the head portion, a first thread is defined as the first thread ($R_1$), a second thread is defined as the second thread ($R_2$), a third thread is defined as the third thread ($R_3$), and a fourth thread is defined as the fourth thread ($R_4$), setting a first area ($Ar_1$) in the first plane of the head portion, a second area ($Ar_2$) in the second plane of the head portion, a third area ($Ar_3$) on a trailing flank of the third thread, a fourth area (Ara) on a trailing flank of the fourth thread, and a fifth area ($Ar_5$) on the contact surface of the contact portion in the cross-section; a step of acquiring five calculated values $X_1$, $X_2$, $X_3$, $X_4$, and $X_5$ obtained by calculating, for each of the first area to the fifth area, the arithmetic mean of the thickness of the plated layer measured at seven points forming a line in one direction at 10 [μm] intervals in each of the first area to the fifth area; a step of acquiring four measured values $T_1$, $T_2$, $T_3$, and $T_4$ obtained by measuring the thickness of the plated layer at each of a root ($M_1$) between the second thread and the third thread, a crest ($M_2$) of the third thread, a root ($M_3$) between the third thread and the fourth thread, and a crest ($M_4$) of the fourth thread in the cross-section; and a step of acquiring, as a fitting average plating thickness t [μm], a calculated value based on the expression $(X_1+X_2+X_3+X_4+X_5+T_1+T_2+T_3+T_4)/9$.

According to this measurement method, the fitting average plating thickness t can be acquired based on the measured values of the thickness of the plated layer at plural places on the tube fitting. The thickness of the plated layer is not uniform over the areas of the tube fitting. However, the thickness affects the mechanical properties of the tube fitting, such as axial force. By using the fitting average plating thickness t as a parameter representative of the thickness of the plated layer of the tube fitting, the correlation between the thickness of the plated layer and the mechanical properties can be accurately evaluated regardless of locational variations in the thickness of the plated layer. For example, when mass-producing plated tube fittings, it becomes possible to accurately estimate the mechanical properties, such as axial force, that the individual tube fittings have by managing the thickness of the plated layer using the fitting average plating thickness t.

The zinc-based plated layer P1 or P2 of the above embodiments corresponds to an example of the plated layer of the above disclosure. In the above disclosure it does not matter whether or not there is a resin coating layer on the outside of the plated layer. Consequently, the above disclosure can also be applied to a tube fitting where the plated layer is positioned at the outermost surface.

The disclosure of Japanese Patent Application No. 2019-156189, filed on Aug. 9, 2019, is incorporated in its entirety herein by reference.

All documents, patent applications, and technical standards mentioned in this specification are incorporated herein by reference to the same extent as if each individual document, patent application, or technical standard were specifically and individually indicated to be incorporated by reference.

The invention claimed is:

1. A tube fitting that is fitted to an outer periphery of a metal tube having, at an end portion thereof, a ring-shaped portion projecting outward in a tube radial direction, and which is, by being fastened to a mating member in a state in which the tube fitting is in contact with the ring-shaped portion, capable of connecting the tube to the mating member, the tube fitting comprising:
a threaded portion in which are formed male threads that mate with female threads provided at the mating member;
a head portion that is provided at one end side of the threaded portion and to which a tightening torque is input during fastening;
a contact portion that is provided at another end side of the threaded portion and is for contacting the ring-shaped portion and simultaneously pressing the ring-shaped portion against the mating member, during fastening to the mating member;
a zinc-based plated layer that is provided at the threaded portion, the head portion, and the contact portion; and
a resin coating layer that is positioned at an outermost surface at an outer side of the zinc-based plated layer and includes a polyethylene-based substance, a lubricant, and solid particles,
wherein:
a through hole extends through the threaded portion, the head portion, and the contact portion, in a direction parallel to an advancing direction of the male threads during fastening,
the male threads of the threaded portion have an outer diameter of 9.53 to 14.0 mm,
the head portion includes a first plane facing an opposite direction from the advancing direction and a second plane orthogonal to the first plane,
the contact portion includes a contact surface capable of contacting the ring-shaped portion and has an inner diameter of 4.98 to 8.44 mm, and
in a case of, counting from a head portion side, the number of threads configuring the male threads in a cross-section that includes a center line extending in the same direction as the through hole and is orthogonal to the second plane of the head portion, a first thread is defined as the first thread, a second thread is defined as the second thread, a thread is defined as the third thread, and a fourth thread is defined as the fourth thread,
a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and
a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 μm intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section,
$2.1 < t < 19.7$ is true.

2. The tube fitting of claim 1, wherein when, in a case in which a testing member corresponding to the mating member and a testing tube with a same outer diameter as the tube and having a testing ringlike portion corresponding to the ring-shaped portion are prepared and a fastening test including a fastening operation for fastening the tube fitting to the testing member with a predetermined tightening torque in a state in which the tube fitting is in contact with the testing ringlike portion and a disconnect operation for loosening the tube fitting after the fastening operation to disconnect the testing tube is repeated n times (where $1 < n < 6$), a maximum axial force occurring in a first fastening test is defined as an initial axial force $F_1$ in kN, a maximum axial force occurring in an n-th fastening test is defined as an n-th axial force $F_n$ in kN, and a value obtained by $-(F_n-F_1)/(n-1)$ is defined as an axial force decrease rate α [kN/test round], $0 < α < 1.75$ is true.

3. The tube fitting of claim 2, wherein the tube is a brake tube used for brake tubing in an automobile, and in a case in which the tightening torque is in a range of 12.0 to 22.0 Nm,
$10.0 < F_1 < 14.0$ is true.

4. A tube equipped with a tube fitting, comprising:
a metal tube having, at an end portion thereof, a ring-shaped portion projecting outward in a tube radial direction and having a bend portion at a position away from the ring-shaped portion; and
a tube fitting that is fitted to an outer periphery of the tube in a state in which the tube fitting is prevented from coming off by the ring-shaped portion and the bend portion, and which is, by being fastened to a mating member in a state in which the tube fitting is in contact with the ring-shaped portion, capable of connecting the tube to the mating member, wherein:

the tube fitting includes a threaded portion in which are formed male threads that mate with female threads provided at the mating member, a head portion that is provided at one end side of the threaded portion and to which a tightening torque is input during fastening, a contact portion that is provided at another end side of the threaded portion and is for contacting the ring-shaped portion and simultaneously pressing the ring-shaped portion against the mating member, during fastening to the mating member, a zinc-based plated layer that is provided at the threaded portion, the head portion, and the contact portion, and a resin coating layer that is positioned at an outermost surface at an outer side of the zinc-based plated layer and includes a polyethylene-based substance, a lubricant, and solid particles, a through hole extends through the threaded portion, the head portion, and the contact portion, in a direction parallel to an advancing direction of the male threads during fastening, the male threads of the threaded portion have an outer diameter of 9.53 to 14.0 mm, the head portion includes a first plane facing an opposite direction from the advancing direction and a second plane orthogonal to the first plane, the contact portion includes a contact surface capable of contacting the ring-shaped portion and has an inner diameter of 4.98 to 8.44 mm, and in a case of, counting from a head portion side, the number of threads configuring the male threads in a cross-section that includes a center line extending in the same direction as the through hole and is orthogonal to the second plane of the head portion, a first thread is defined as the first thread, a second thread is defined as the second thread, a third thread is defined as the third thread, and a fourth thread is defined as the fourth thread, a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and a value obtained by $(X_1+X_2+X_3+X_4+X_5+T_1+T_2+T_3+T_4)/9$ is defined as a fitting average plating thickness tin μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 in μm intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section, $2.1 < t < 19.7$ is true.

5. The tube equipped with a tube fitting of claim 4, wherein when, in a case in which a testing member corresponding to the mating member and a testing tube with a same outer diameter as the tube and having a testing ringlike portion corresponding to the ring-shaped portion are prepared and a fastening test including a fastening operation for fastening the tube fitting to the testing member with a predetermined tightening torque in a state in which the tube fitting is in contact with the testing ringlike portion and a disconnect operation for loosening the tube fitting after the fastening operation to disconnect the testing tube is repeated n times (where $1<n<6$), a maximum axial force occurring in a first fastening test is defined as an initial axial force $F_1$ in kN, a maximum axial force occurring in an n-th fastening test is defined as an n-th axial force $F_n$ in kN, and a value obtained by $-(F_n-F_1)/(n-1)$ is defined as an axial force decrease rate α [kN/test round], $0<\alpha<1.75$ is true.

6. The tube equipped with a tube fitting of claim 5, wherein the tube is a brake tube used for brake tubing in an automobile, and in a case in which the tightening torque is in a range of 12.0 to 22.0 Nm, $10.0 < F_1 < 14.0$ is true.

7. A tube fitting that is fitted to an outer periphery of a metal tube having, at an end portion thereof, a ring-shaped portion projecting outward in a tube radial direction, and which is, by being fastened to a mating member in a state in which the tube fitting is in contact with the ring-shaped portion, capable of connecting the tube to the mating member, the tube fitting comprising:

a threaded portion in which are formed male threads that mate with female threads provided at the mating member;

a head portion that is provided at one end side of the threaded portion and to which a tightening torque is input during fastening;

a contact portion that is provided at another end side of the threaded portion and is for contacting the ring-shaped portion and simultaneously pressing the ring-shaped portion against the mating member, during fastening to the mating member;

a zinc-based plated layer that is provided at the threaded portion, the head portion, and the contact portion; and a resin coating layer that is positioned at an outermost surface at an outer side of the zinc-based plated layer and includes a polyethylene-based substance, a lubricant, and solid particles, wherein:

a through hole extends through the threaded portion, the head portion, and the contact portion, in a direction parallel to an advancing direction of the male threads during fastening, the male threads of the threaded portion have an outer diameter of 9.53 to 14.0 mm, the head portion includes a first plane facing an opposite direction from the advancing direction and a second plane orthogonal to the first plane, the contact portion includes a contact surface capable of contacting the ring-shaped portion and has an inner diameter of 4.98 to 8.44 mm, in a case of, counting from a head portion side, the number of threads configuring the male threads in a cross-section that includes a center line extending in the same direction as the through hole and is orthogonal to the second plane of the head portion, a first thread is defined as the first thread, a second thread is defined as the second thread, a third thread is defined as the third thread, and a fourth thread is defined as the fourth thread, a first area set in the first plane of the head portion, a second area set in the second plane of the head portion, a third area set on a trailing flank of the third thread, a fourth area set on a trailing flank of the fourth thread, and a fifth area set on the contact surface of the contact portion are defined in the cross-section, and a value obtained by $(X_1+X_2+X_3+X_4+X_5+T_1+T_2+T_3+T_4)/9$ is defined as a fitting average plating thickness t in μm in a case in which $X_1$, $X_2$, $X_3$, $X_4$, and $X_5$ denote five calculated values obtained by calculating, for each of the first area to the fifth area, the arithmetic mean of a thickness of the zinc-based plated layer measured at seven points forming a line in one direction at 10 μm intervals in each of the first area to the fifth area and $T_1$, $T_2$, $T_3$, and $T_4$ denote four measured values obtained by measuring the thickness of the zinc-based plated layer at each of a root between the second thread and the third thread, a crest of the third thread, a root between the third thread and the fourth thread, and a crest of the fourth thread in the cross-section, and in a case in which a testing member corresponding to the mating member and a testing tube with a same outer diameter as the tube and having a testing ringlike portion corresponding to the ring-shaped portion are prepared and a fastening test including a fastening operation for fastening the tube fitting to the testing member with a tightening torque in a range of 12.0 to 22.0 Nm in a state in which the tube fitting is in contact with the testing ringlike portion and a disconnect operation for loosening the tube fitting after the fastening operation to disconnect the testing tube is repeated n times (where $1<n<6$), a maximum axial force occurring in a first fastening test is defined as an initial axial force $F_1$ in kN, a maximum axial force occurring in an n-th fastening test is defined as an n-th axial force $F_n$ in kN, and a value obtained by $-(F_n-F_1)/(n-1)$ is defined as an axial force decrease rate α [kN/test round], a range of the fitting average plating thickness t is set so that $10.0<F_1<14.0$ and $0<α<1.75$ are true.

8. The tube fitting of claim 7, wherein the range of the fitting average plating thickness t is $2.1<t<19.7$.

* * * * *

UNITED STATES PATENT AND TRADEMARK OFFICE
CERTIFICATE OF CORRECTION

PATENT NO. : 11,958,454 B2
APPLICATION NO. : 17/634064
DATED : April 16, 2024
INVENTOR(S) : Takahiro Gunji et al.

Page 1 of 1

It is certified that error appears in the above-identified patent and that said Letters Patent is hereby corrected as shown below:

In the Claims

Column 26, Line 13, Claim 1, "thread" should be -- third thread --.

Signed and Sealed this
Eleventh Day of February, 2025

Coke Morgan Stewart
*Acting Director of the United States Patent and Trademark Office*